(12) United States Patent
Hong et al.

(10) Patent No.: US 10,516,741 B2
(45) Date of Patent: Dec. 24, 2019

(54) CONTROL DEVICE AND METHOD FOR CONTROLLING FUNCTION THEREOF

(71) Applicant: Samsung Electronics Co., Ltd., Gyeonggi-do (KR)

(72) Inventors: Ye Seul Hong, Seoul (KR); Jae Seok Myung, Gyeonggi-do (KR); Yoon Su Kim, Seoul (KR); Sahng Hee Bahn, Gyeonggi-do (KR); Jung Joo Sohn, Seoul (KR); Kyung Ho Jeong, Seoul (KR); Young Kyu Jin, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/969,078

(22) Filed: May 2, 2018

(65) Prior Publication Data
US 2018/0332119 A1    Nov. 15, 2018

(30) Foreign Application Priority Data

May 11, 2017  (KR) .......................... 10-2017-0058919
Jan. 11, 2018  (KR) .......................... 10-2018-0003942

(51) Int. Cl.
*H04L 29/08*   (2006.01)
*G08C 17/02*   (2006.01)
(Continued)

(52) U.S. Cl.
CPC ............ *H04L 67/125* (2013.01); *G08C 17/02* (2013.01); *H04L 12/2816* (2013.01);
(Continued)

(58) Field of Classification Search
CPC ............. H04L 12/2816; H04L 12/2827; H04L 12/282; G08C 2201/32; G08C 2201/91; G06F 3/1423; H04B 1/205
See application file for complete search history.

(56) References Cited

U.S. PATENT DOCUMENTS 6,636,157 B1 * 10/2003 Sato ....................... H04B 1/205
                                                              340/12.5
8,258,930 B2    9/2012 Park et al.
(Continued)

FOREIGN PATENT DOCUMENTS

KR       10-0643307 B1    10/2006
KR    10-2008-0111855 A   12/2008
(Continued)

OTHER PUBLICATIONS

European Search Report dated Sep. 14, 2018.

*Primary Examiner* — Mirza F Alam
(74) *Attorney, Agent, or Firm* — Cha & Reiter, LLC.

(57) ABSTRACT

According to an embodiment, a smart control device includes an input device; a communication circuit; a connection circuit configured to be electrically connected to another control device; a processor; and a memory. Wherein the memory stores one or more instructions that, when executed, cause the processor to when the control device is not connected with the another control device through the connection circuit, transmit a message associated with a request for execution of a first function to the external device through the communication circuit when receiving an input signal based on the input device; and in when control device is connected with the another control device through the connection circuit, transmit a message associated with a request for execution of a second function corresponding to (Continued)

the second state to the external device through the communication circuit when receiving a user input associated with execution of a specified function.

20 Claims, 21 Drawing Sheets

(51) Int. Cl.
*H04W 4/80* (2018.01)
*H04L 12/28* (2006.01)
*H04B 5/00* (2006.01)

(52) U.S. Cl.
CPC ........... *H04L 12/2827* (2013.01); *H04W 4/80* (2018.02); *G08C 2201/30* (2013.01); *G08C 2201/93* (2013.01); *H04B 5/0031* (2013.01); *H04B 5/0075* (2013.01)

(56) References Cited

U.S. PATENT DOCUMENTS

| | | | |
|---|---|---|---|
| 9,602,645 B2 | 3/2017 | Eaton et al. | |
| 10,002,524 B2 | 6/2018 | Shim et al. | |
| 2006/0061464 A1* | 3/2006 | Okada | B60G 17/0161 |
| | | | 340/459 |
| 2006/0164208 A1* | 7/2006 | Schaffzin | G07C 9/00182 |
| | | | 340/5.64 |
| 2007/0014199 A1 | 1/2007 | Park et al. | |
| 2010/0118195 A1 | 5/2010 | Eom et al. | |
| 2014/0167929 A1 | 6/2014 | Shim et al. | |
| 2014/0342663 A1* | 11/2014 | Eaton | H04M 1/04 |
| | | | 455/41.1 |
| 2018/0285065 A1* | 10/2018 | Jeong | G10L 15/08 |

FOREIGN PATENT DOCUMENTS

| | | |
|---|---|---|
| KR | 10-2016-0000819 A | 1/2016 |
| KR | 10-2016-0048466 A | 5/2016 |

* cited by examiner

CONTROL DEVICE AND METHOD FOR CONTROLLING FUNCTION THEREOF

CROSS-REFERENCE TO RELATED APPLICATION(S)

This application is based on and claims priority under 35 U.S.C. § 119 to Korean Patent Application No. 10-2018-0003942, filed on Jan. 11, 2018 and Korean Patent Application No. 10-2017-0058919, filed on May 11, 2017, in the Korean Intellectual Property Office, the disclosure of which is incorporated by reference herein its entirety.

BACKGROUND

1. Field

Embodiments of the present disclosure described herein relate to a technology for remotely controlling things.

2. Description of Related Art

Electronic devices remotely control a variety of devices with the development of Internet of Things (IoT) technology. For example, a portable electronic device may remotely control indoor devices connected to a home network.

The above information is presented as background information only to assist with an understanding of the present disclosure. No determination has been made, and no assertion is made, as to whether any of the above might be applicable as prior art with regard to the present disclosure.

SUMMARY

Smart buttons using IoT technology can perform remote control with one click. In the related art, a smart button may provide a function specified for the button. Accordingly, it may be impossible or troublesome to change the specified function for the smart button.

Aspects of the present disclosure are to address at least the above-mentioned problems and/or disadvantages and to provide at least the advantages described below. Accordingly, an aspect of the present disclosure is to provide a smart control device and system and a control method thereof that are capable of providing a function specified for a tag.

In accordance with another aspect of the present disclosure, a control device includes a housing including a first surface and a second surface facing away from the first surface; an input device exposed through a portion of the first surface; a communication circuit disposed between the first surface and the second surface and capable of communication with an external device; a connection circuit exposed through a portion of at least one of the first surface and the second surface and configured to be electrically connected with another control device; a processor disposed between the first surface and the second surface and operatively connected with the input device, the communication circuit, and the connection circuit; and a memory disposed between the first surface and the second surface and electrically connected with the processor, wherein the memory stores one or more instructions that, when executed, cause the processor to: when the control device is not connected with the another control device through the connection circuit, transmit a message associated with a request for execution of a first function to the external device through the communication circuit when receiving an input signal based on the input device; and when the control device is connected with the another control device through the connection circuit, transmit a message associated with a request for execution of a second function corresponding to the second state to the external device through the communication circuit when receiving a user input associated with execution of a specified function.

In accordance with another aspect of the disclosure, a control device includes a housing including a first surface and a second surface facing away from the first surface; an input device exposed through a portion of the first surface; a communication circuit disposed between the first surface and the second surface and capable of communication with an external device; a connection circuit exposed through a portion of at least one of the first surface and the second surface and configured to be electrically connected with another control device; a processor disposed between the first surface and the second surface and operatively connected with the input device, the communication circuit, and the connection circuit; and a memory configured to store identification information, the memory being disposed between the first surface and the second surface and electrically connected with the processor, wherein the memory stores one or more instructions that, when executed, cause the processor to: when the control device is not connected with the another control device through the connection circuit, transmit a message associated with a request for execution of a first function to the external device through the communication circuit when receiving an input signal from the input device; and when the control device is connected with the another control device through the connection circuit, transmit the identification information to the another control device through the connection circuit thereby causing the another control device to request a second function from the external device in response to a user input.

In accordance with another aspect of the present disclosure, a method for controlling a function by a control device includes: determining whether the control device is connected with another control device through a connection circuit; when the control device is not connected with the another control device, transmitting a message associated with a request for execution of a first function to an external device through a communication circuit when receiving a message based on an input device; and when the control device is connected with the another control device, transmitting a message associated with a request for execution of a second function corresponding to the second state to the external device through the communication circuit when receiving a user input associated with execution of a specified function.

According to embodiments of the present disclosure, a tag may be physically combined with a body of a button, and a function specified for the tag may be performed in response to an operation of the button.

In addition, the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numerals are used to depict the same or similar elements, features, and structures.

DETAILED DESCRIPTION

Figure 1:
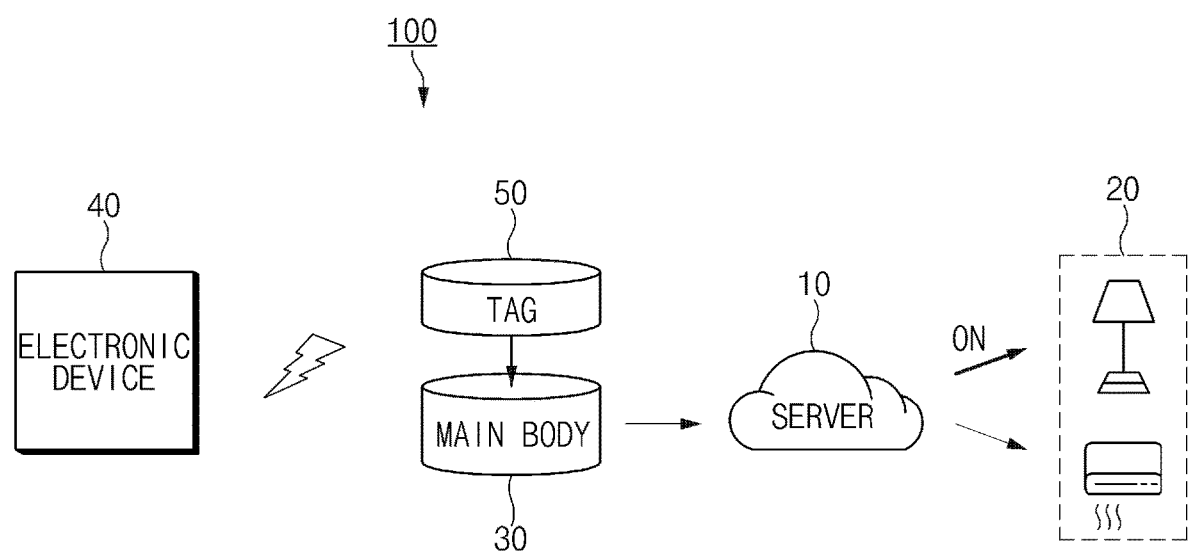
FIG. 1 illustrates a configuration of a smart control system according to an embodiment.

FIG. 1 illustrates a configuration of a smart control system according to an embodiment.

Referring to FIG. 1, a smart control system 1000 according to an embodiment may include a smart control device 30, a server 10, an electronic device 40, and a target device 20. In an embodiment, some elements may be omitted, or additional elements may be further included. In an embodiment, some of the elements may be combined together to form one object, but the object may identically perform the functions of the corresponding elements before the combination. Input/output relationships illustrated in FIG. 1 are merely illustrative for the convenience of description, and the present disclosure is not limited thereto. The smart control device 30 will be described in more detail in FIGS. 2 and 3. The electronic device 40 will be described in more detail in FIG. 4.

According to an embodiment, the smart control device 30 may be configured such that a tag 50 is detachable from the smart control device 30. For example, the smart control device 30 may include a slot or a connector from which the tag 50 is detachable. The tag 50 may be, for example, an NFC tag.

An NFC tag can comprise a passive element with an induction coil and memory storing information. Responsive to an NFC signal, the NFC tag can transmit the data from the memory using NFC Communication.

According to an embodiment, the smart control device 30 may detect a specified operation. For example, the smart control device 30 may include a button that is pushed in a specified direction and a processor for recognizing an operation of the button. In another example, the smart control device 30 may include at least one of a pressure sensor for detecting force exerted in a specified direction and a touch sensor for detecting a touch in a specified direction, a dial and rotation sensor, and a processor for detecting a specified operation based on an output of the corresponding sensor. In this disclosure, the smart control device 30 shall include a button that is operated (e.g., pushed or pulled) in a specified direction, although it shall be understood that other configurations are possible.

According to an embodiment, the smart control device 30 may read tag information from the tag 50 over specified short-range communication when detecting that the button is operated in a specified direction, with the tag 50 attached or in proximity to the smart control device 30. The smart control device 30 may transmit the read tag information to the server 10 corresponding to the tag information. For example, the smart control device 30 may identify a server address and a tag ID by reading the tag information (e.g., a server URL and a tag ID) from the attached or proximate tag 50. The smart control device 30 may transmit the tag ID to the server 10 corresponding to the identified server address. In an embodiment, the server 10 may store information about a function corresponding to the tag ID and information about a device to execute the function. The device information may include at least one of a device URL, a MAC address, and an IP address. The server 10, when receiving the tag ID, may instruct the device corresponding to the tag ID to execute the function corresponding to the tag ID.

According to an embodiment, the smart control device 30 may communicate with the server 10 through a second specified method. For example, the smart control device 30 may receive communication environment information from the electronic device 40 over specified communication (e.g., NFC communication) and may make a communication configuration for communication with the server 10, based on the received communication environment information. The communication environment information may include, for example, a connection ID, authentication information, a userID, and a password for connection to an access point that relays the communication with the server 10.

According to an embodiment, the electronic device 40 may be a device in which an application configured to be triggered or receive input from the smart control device 30 is installed. The application may provide a user interface for at least one of a communication configuration and function settings for the smart control device 30. The application may provide a user interface for recording the tag information in the tag 50. The tag information recorded in the tag 50 may be the server address specified for the application. The electronic device 40 may be, for example, a smartphone, a tablet PC, a portable terminal, or the like.

In an embodiment, the electronic device 40 may identify communication environment information for specified communication when detecting or receiving a first input through the application. The first input may be, for example, an input for a request to set a communication path between the smart control device 30 and the server 10. The communication environment information may include, for example, a connection ID and a password of an access point that performs specified communication (e.g., WiFi communication) with the electronic device 40. In an embodiment, the electronic device 40 may transmit the identified communication environment information to the smart control device 30 while the electronic device 40 is close to the smart control device 30.

In an embodiment, the electronic device 40 may change the function set for the tag 50 when requested to change the function specified for the tag 50. For example, the electronic device 40 may set, through the specified application, at least one of a server to which the tag ID is to be transmitted, a function specified for the tag ID, and a target device to execute the specified function. In another example, the electronic device 40 may transmit, to the server 10, information about a function to be changed through the specified application. In another example, the electronic device 40 may record, in the tag 50, a server address specified for a function to be changed. In another example, when a function to be changed through the specified application and a target device to execute the function to be changed are set, the electronic device 40 may request the server 10 to register the set function and target device.

According to an embodiment, the server 10 may store a lookup table with which tag information, target device information, and function information are associated. The lookup table may store, for example, a tag ID, a target device ID, and a function ID by making an association therebetween. The server 10 may additionally store a control command corresponding to the function ID. The control command may be a command to the target device 20 to perform a function specified for the tag ID. The server 10 may additionally store device address information corresponding to the target device ID. The device address information may include a communication path address by which to transmit the control command to the target device 20.

According to an embodiment, the server 10 may additionally provide an interface for registering a target device list and a target device address. The target device list may be, for example, a list of target devices to execute a function. The target device address may be, for example, a path address by which a control command for performing a specified function is transmitted from the server 10 to the target device 20. In response to a request of the electronic device 40, the server 10 may provide a target device list registered in the server 10.

According to an embodiment, the server 10 may provide a user interface for registering a function specified for a tag ID and a target device to perform the specified function. When the server 10 receives tag information, selected function information, and selected target device information from the electronic device 40, the server 10 may store the tag information, the selected function information, and the selected target device information, for example, by associating them with a lookup table.

According to an embodiment, the server 10, when receiving a tag ID, may identify a target device ID and a function ID that correspond to the tag ID, based on the lookup table. The server 10 may transmit, to the target device 20 corresponding to the identified target device ID, a command to perform a function corresponding to the identified function ID.

According to an embodiment, in the case where a plurality of functions are specified for a tag ID, the server 10 may select a function to be performed, based on additional information. For example, the additional information may be the number of times the tag ID is received by the server 10. In another example, the number of times may be the number of operations of the smart control device 30, which is counted and transmitted by the smart control device 30. The server 10 may be, for example, a contents streaming server, and the target device 20 may be a speaker. In the case where the number of times is an odd number, the server 10 may instruct the speaker to perform a contents reproduction function, while providing, to the speaker, contents to be streamed. Likewise, in the case where the number of times is an even number, the server 10 may instruct the speaker to stop reproducing contents without transmitting contents to the speaker.

According to an embodiment, the server 10 may include a communication unit, a memory, and at least one processor. The communication unit may communicate with the smart control device 30. The memory may store a lookup table, a control command, device address information, and the like. The memory may include at least one of a device address corresponding to a target device ID and a function execution command corresponding to a target device. The processor, when receiving a tag ID, may transmit a control command corresponding to the tag ID to a target device corresponding to the tag ID.

According to an embodiment, the target device 20 may be remotely controlled through a wired/wireless network. For example, the target device 20 may be an indoor device, such as a lighting device, a speaker, or the like. The target device 20 may be, for example, an online server that provides a chicken delivery service, a call taxi service, or the like.

According to an embodiment, the electronic device 40 and the smart control device 30 may use different operating systems. Examples of an operating system may include Tizen, Android, iOS (iPhone OS), Tizen RT, and the like. Even in this case, an application of the smart control device 30 may be supported to communicate with the electronic device 40 by using an OS-independent communication layer.

In an embodiment, a specified function may be performed for a tag attached to the smart control device 30. A provider may distribute and sell a tag having a server address recorded therein to easily provide a function corresponding to the tag. In an embodiment, a function corresponding to an operation of the smart control device 30 may be easily changed by replacing a tag or by settings via an application.

Figure 2:
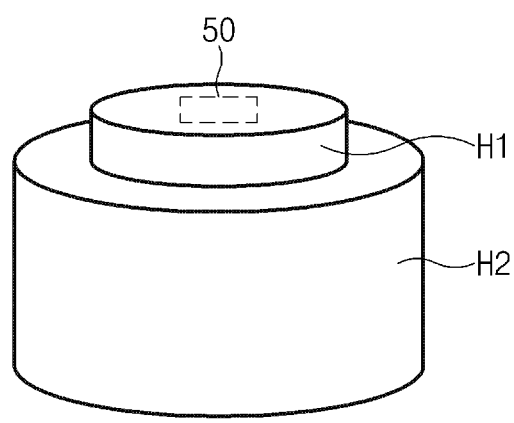
FIG. 2 illustrates a smart control device according to an embodiment.

FIG. 2 illustrates a smart control device according to an embodiment.

Referring to FIG. 2, a housing H1 and H2 according to an embodiment may contain and protect circuit elements of the smart control device 30. A detailed configuration of the circuit elements will be described below with reference to FIG. 3.

According to an embodiment, the housing H1 and H2 may be implemented in various shapes, such as a cylindrical shape, an oval shape, or the like. The housing H1 and H2 may be placed at, or attached to, a specified position. The housing H1 and H2 may be implemented by a combination of the first member H1 and the second member H2.

According to an embodiment, the first member H1 may have a slot or a connector from which the tag 50 is detachable. For example, the slot or the connector may be formed on an inner surface of the first member H1. In this case, the tag 50 may be attached to, or detached (or removed) from, the slot or the connector, with the first member H1 and the second member H2 separated from each other.

According to an embodiment, the second member H2 may include a groove or hole to which the first member H1 is mechanically coupled, and may be combined with the first member H1 through the groove or hole. For example, the second member H2 may include a groove having a shape corresponding to the first member H1 and may be mechanically combined with the first member H1 by inserting the first member H1 into the groove.

According to an embodiment, the first member H1 and the second member H2 mechanically combined with each other may be operated in a specified direction, for example, in a direction from the first member H1 to the second member H2. For example, the first member H1 and the second member H2 may be spaced apart from each other by a predetermined distance, and a mechanical button (e.g., a dip switch) may be disposed in the spacing space. When the first member H1 is pushed in the specified direction, the mechanical button may be pressed by the first member H1. In another example, at least one of a pressure sensor for detecting pressure applied in the specified direction and a touch sensor for detecting a touch input in the specified direction may be provided between the first member H1 and the second member H2. When the first member H1 is pushed in the specified direction, the pressure sensor or the touch sensor may detect pressure or a touch applied in the specified direction.

Figure 3:
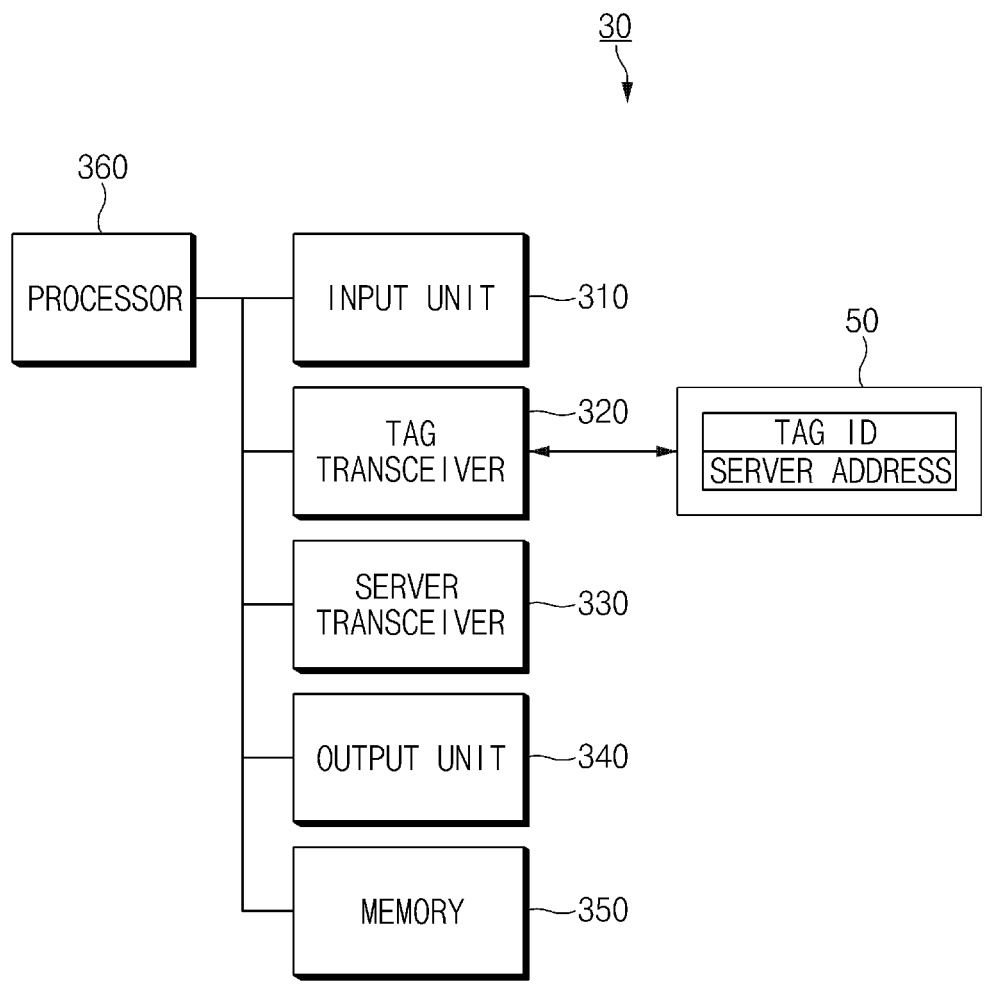
FIG. 3 illustrates a configuration of a smart control device according to an embodiment.

FIG. 3 illustrates a configuration of a smart control device according to an embodiment.

Referring to FIG. 3, the smart control device 30 according to an embodiment may include an input unit 310, a tag transceiver 320, a server transceiver 330, an output unit 340, a memory 350, and a processor 360. The input unit 310, the tag transceiver 320, the server transceiver 330, the memory 350, and the processor 360 may be arranged inside the housing H1 and H2. In an embodiment, some elements may be omitted, or additional elements may be further included. In an embodiment, some of the elements may be combined together to form one object, but the object may identically perform the functions of the corresponding elements before the combination.

According to an embodiment, the input unit 310 may detect a user operation, based on a force exerted by the first member H1. The input unit 310 may include at least one of a mechanical button for detecting an operation in a specified direction, a pressure sensor for detecting pressure applied in the specified direction, and a touch sensor for detecting a touch in the specified direction. For purposes of this disclosure, the input unit 310 is a button that is operated (e.g., pushed or pulled) in the specified direction, although other configurations are possible.

According to an embodiment, the tag transceiver 320 may read information out of the tag 50. For example, the tag transceiver 320 may include an NFC communication unit that reads information out of the tag 50 over NFC communication under instruction of the processor 360. For purposes of this disclosure, the tag 50 is an NFC tag and the tag transceiver 320 is an NFC communication unit, although the tag 50 and recognition unit are not limited to NFC communications.

According to an embodiment, the server transceiver 330 may communicate with the server 10. For example, the server transceiver 330 may communicate with the server 10 through various wireless communication methods, such as WiFi, 3G, LTE, or the like. In certain embodiments, the server transceiver 330 may communicate with the server 10 over a wired connection, as well.

According to an embodiment, the output unit 340 may show an operating state of the smart control device 30. The operating state may include, for example, a communication connection state, whether an error occurs or not, a tag recognition state, or the like. For example, the output unit 340 may be at least one LED that indicates the operating state in different colors. In another example, the output unit 340 may be a display that displays an icon, text, or the like that corresponds to the operating state. In another example, the output unit 340 may include a sound output unit (e.g., a buzzer, a speaker, or the like) that informs of the operating state with sound.

According to an embodiment, the memory 350 may be a volatile memory (e.g., a RAM), a non-volatile memory (e.g., a ROM, a flash memory, or the like), or a combination thereof. The memory 350 may store, for example, commands or data associated with at least one other element of the smart control device 30. The memory 350 may store tag information read out of the tag 50.

According to an embodiment, the processor 360 may be electrically connected with the input unit 310, the tag transceiver 320, and the transceiver 330. The processor 360 may include at least one of, for example, a central processing unit (CPU), a graphics processing unit (GPU), a microprocessor, an application processor, an application specific integrated circuit (ASIC), and field programmable gate arrays (FPGA) and may have a plurality of cores. The processor 360 may perform operations or data processing associated with control and/or communication of at least one other element of the smart control device 30.

According to an embodiment, the processor 360 may detect an operation of the input unit 310 while the tag 50 is attached to the smart control device 30. When detecting the operation of the input unit 310 while the tag 50 is attached to the smart control device 30, the processor 360 may recognize, through the tag transceiver 320, tag information recorded in the tag 50. The tag information may include at least one of a tag ID and the address (e.g., URL) of the server 10.

According to an embodiment, the processor 360 may read the tag information from the tag 50 or the memory 350. For example, the processor 360 may read the tag information from the tag 50 through the tag transceiver 320 when detecting the operation of the input unit 310. In another example, the processor 360 may store, in the memory 350, the tag information recorded in the tag 50 and may read the tag information from the memory 350 when detecting the operation of the input unit 310. The processor 360 may read the tag information from the tag 50 and may store the tag information in the memory 350 when detecting the attachment of the tag 50 or when detecting the operation of the input unit 310 for the first time after the attachment of the tag 50. In the latter case, the smart control device 30 may further include a detection means for detecting whether the tag 50 is attached or not. The detection means may include, for example, a mechanical contact for outputting different signals depending on whether the tag 50 is attached to a connector or a slot of the smart control device 30. The processor 360 may detect whether the tag 50 is attached or not, based on a signal received from the mechanical contact. When detecting the operation of the input unit 310, the processor 360 may determine, through the detection means, whether the tag 50 is attached or not, and only when it is determined that the tag 50 is attached, the processor 360 may request the server 10 to perform a function corresponding to the tag information.

According to an embodiment, the processor 360 may analyze the recognized tag information to identify the address of the server 10 and the tag ID from the tag information. The address may be, for example, URL information of the server 10. In an embodiment, the processor 360 may access the identified address through the transceiver 330 and may request the server 10 to perform the function corresponding to the tag ID. For example, the processor 360 may transmit the tag ID to the identified address of the server 10. For example, the server 10, when receiving the tag ID, may transmit a control command corresponding to the tag ID to a target device corresponding to the tag ID. The control command may be a command to perform the function corresponding to the tag ID.

According to an embodiment, after transmitting the tag information, the processor 360 may determine whether a response as to whether the function is completely performed is received from the server 10. The response may be information that is transmitted from the target device 20 based on a response as to whether the function is completely performed, after the server 10 instructs the target device 20 to perform the function corresponding to the tag ID. When the response corresponding to the tag information is received, the processor 360 may inform of a function execution result through the output unit 340. For example, the processor 360 may determine a success or failure in performing the function, based on the received response and may inform of the success or failure through the output unit 340.

According to an embodiment, the processor 360 may further identify an operating method of the input unit 310. The operating method may include at least one of, for example, the number of times the input unit 310 is operated and the duration of the operation. The processor 360 may additionally transmit information about the operating method when transmitting the tag ID. In this case, the server 10 may identify a function to be performed among functions specified for the tag ID, based on the operating method information and may instruct a specified target device to perform the identified function. For example, the server 10 may be a contents streaming server, and the target device 20 may be a speaker. In the case where the number of times the input unit 310 is operated is an odd number, the server 10 may instruct the speaker to perform a contents reproduction function, while providing, to the speaker, contents to be streamed. In the case where the number of times the input unit 310 is operated is an even number, the server 10 may instruct the speaker to stop reproducing contents without transmitting contents to the speaker.

According to an embodiment, the smart control device 30 may further include at least one of a battery and a power supply. The battery may output driving voltage for driving each element of the smart control device 30. In the case where voltage received from the battery or an external power supply is different in magnitude from the driving voltage for each element of the smart control device 30, the power supply may convert the received voltage into voltage with a specified magnitude.

Figure 4:
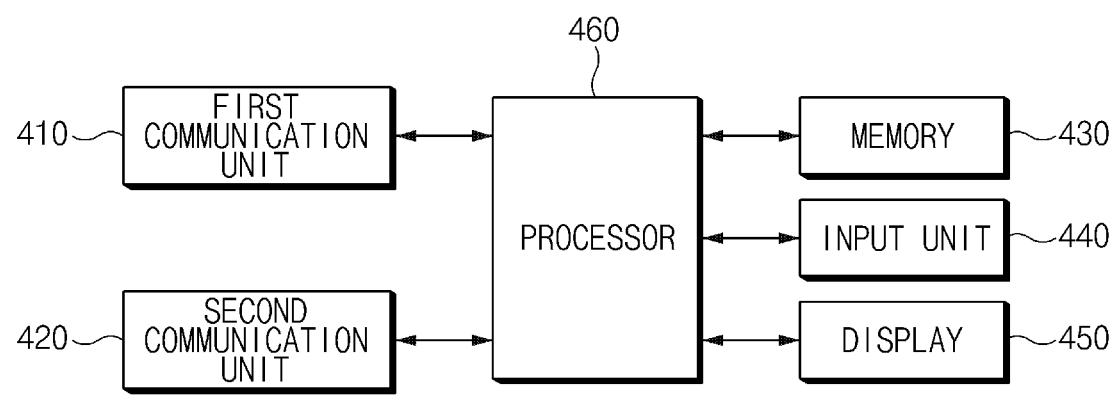
FIG. 4 illustrates a configuration of an electronic device according to an embodiment.

FIG. 4 illustrates a configuration of an electronic device according to an embodiment.

Referring to FIG. 4, the electronic device 40 according to an embodiment may include a first communication unit 410, a second communication unit 420, a memory 430, a display 450, an input unit 440, and a processor 460.

According to an embodiment, the first communication unit 410 may communicate with the smart control device 30 through a first specified method. For example, the first communication unit 410 may transmit communication environment information to the smart control device 30 through NFC communication. In another example, the first communication unit 410 may record or write a server address in the tag 50, which is attached to the smart control device 30, through NFC communication.

According to an embodiment, the first communication unit 410 may support communication with the smart control device 30 located within a specified distance. For example, the first communication unit 410 may transmit the communication environment information to the smart control device 30 located within the specified distance. In another example, the first communication unit 410 may transmit the server address to the tag 50 located within the specified distance.

According to an embodiment, the second communication unit 420 may communicate with another device (e.g., an access point or a server) through a second specified method. The second method may be a wireless communication method, such as WiFi, 3G, LTE, or the like, or a wired communication method.

According to an embodiment, the memory 430 may be a volatile memory (e.g., a RAM), a non-volatile memory (e.g., a ROM, a flash memory, or the like), or a combination thereof. The memory 430 may store, for example, commands or data associated with at least one other element of the electronic device 40. For example, the memory 430 may store an application specified for the server 10 and a command to execute each menu of the application.

According to an embodiment, the display 450 may include, for example, a liquid crystal display (LCD), a light-emitting diode (LED) display, an organic light-emitting diode (OLED) display, or an electronic paper display. The display 450 may display, for example, various types of contents (e.g., text, images, videos, icons, symbols, and/or the like) to a user.

According to an embodiment, the input unit 440 may receive a user input. The input unit 440 may be, for example, a touch screen.

According to an embodiment, the processor 460 may display at least one menu icon when a specified application is executed. The menu icon may include at least one of a tag identification menu, a tag recording menu, a function setting menu, and a target-device setting menu. The menus may be integrated to form at least one menu, or may be divided into two or more groups. For example, the tag identification menu and the tag recording menu may be integrated with each other.

According to an embodiment, the processor 460 may record a server address in the tag 50 through the first communication unit 410 when the tag recording menu is selected through the input unit 440. For example, the processor 460 may identify a server address specified for the application. The processor 460 may record the identified server address in the tag 50 through the first communication unit 410. In an embodiment, the processor 460 may determine whether the tag 50 is a re-writable tag and may update tag information stored in the tag 50 in the case where the tag 50 is a re-writable tag. For example, the processor 460 may read the tag information out of the tag 50 through the first communication unit 410. The read tag information may include, for example, a write-flag that represents whether the tag 50 is rewritable. The read tag information may further include, for example, a tag ID. The processor 460 may determine whether the tag 50 is a re-writable tag, based on the write-flag and may record the server address in the tag 50 when it is determined that the tag 50 is re-writable.

According to an embodiment, the processor 460 may display a selectable target device list when the target-device setting menu is selected through the input unit 440. The target-device setting menu may be, for example, a menu for setting a target device that performs a function. For example, the processor 460 may receive a target device list, which is registered in the server 10, from the server 10 through the second communication unit 420 and may display the received target device list.

According to an embodiment, when the function setting menu is selected through the input unit 440, the processor 460 may display a list of functions that are executable in a selected target device. When a function is selected from the displayed function list through the input unit 440, the processor 460 may store a function ID corresponding to the function. The function may be a function to be performed when the smart control device 30 is operated.

According to an embodiment, the processor 460 may register, in the server 10, information required for performing a function that corresponds to the tag ID. For example, the processor 460 may correlate the tag ID, the selected function information (e.g., the function ID), and the selected target device information (e.g., the target device ID) each other and transmit the correlated one to the server 10.

According to an embodiment, the tag 50 may be a first tag distributed (or sold) to control an indoor device (e.g., a light). In this case, a server address recorded in the first tag may be a first server (e.g., a home network server) that remotely controls an indoor light. The application may communicate with the first server to provide an indoor light list as a target device list. The application may communicate with the first server to provide a specified function for at least one of going out, coming home, getting up, and sleeping, as a function list. For example, a specified function for going out or sleeping may be a function of turning off a selected light. In another example, a specified function for coming home and getting up may be a function of turning on the selected light. When receiving a tag ID of the first tag, the server 10 may instruct at least one light selected from the indoor light list to perform a function specified for going-out, coming home, getting-up, or sleeping.

According to an embodiment, the tag 50 may be a tag distributed or sold by a contents streaming service provider. In this case, a server address recorded in the tag may be a server (e.g., a streaming service server) that provides a contents streaming service. The application may communicate with the server to provide a registered speaker list as a target device list. The application may communicate with the server to provide at least one of a contents reproduction function and a reproduction stop function, as a function list. For example, the contents reproduction function may be a function of reproducing contents through a selected speaker. In another example, the reproduction stop function may be a function of stopping reproducing contents through the selected speaker. When receiving a tag ID of the tag, the server 10 may instruct the selected speaker to perform a function of playing contents or a function of stopping reproducing contents.

According to an embodiment, the tag 50 may be a tag distributed or sold for a call taxi service provider (or a room service provider). In this case, a server address recorded in the tag may be a server to be called (e.g., a call taxi service server or a room service server). The application may communicate with the third server to provide a call taxi service server list (or a room service server list) as a target device list. The application may communicate with the server to provide a taxi call function (or a room service call function) as a function list. In this case, the smart control device 30 may be installed in a taxi stand (or a hotel). When receiving a tag ID of the tag, the server 10 may identify a call location, based on the tag ID and may inform of location information of the tag to a device installed in a taxi (or a hotel front desk) corresponding to the call location.

According to an embodiment, the tag 50 may be a tag distributed or sold for a food delivery service provider. In this case, a server address recorded in the tag may be an online server (a server) for a food delivery service. The application may communicate with the server to provide a food delivery service provider list as a target device list. The application may communicate with the server to provide a function of ordering delivery food, as a function list. When receiving a tag ID of the tag, the server 10 may identify a call location and order information, based on the tag ID. The server 10 may transmit a call address and order information to a target device installed in a location close to the call address.

Figure 5:
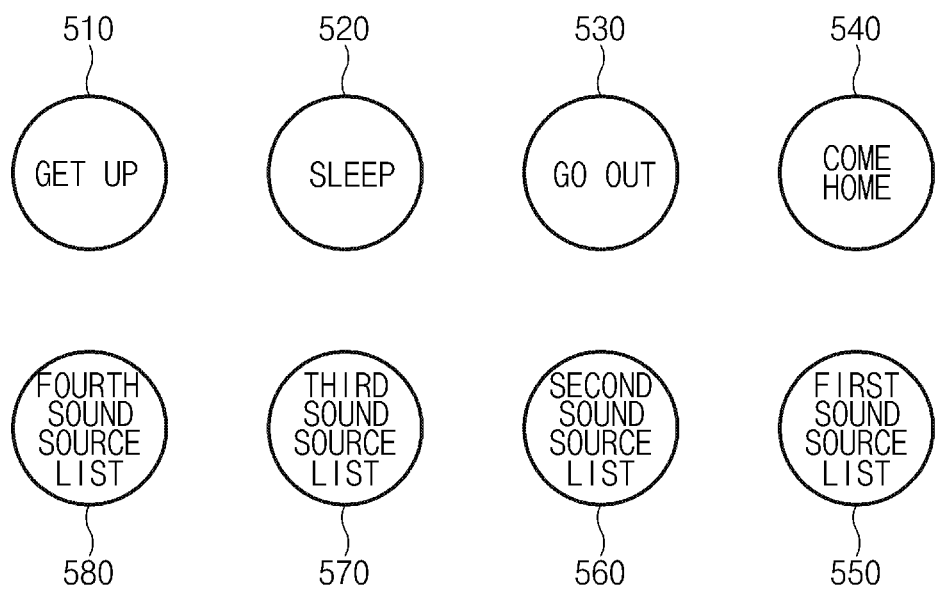
FIG. 5 illustrates an interface screen of a smart control device according to another embodiment.

FIG. 5 illustrates an interface screen of a smart control device according to another embodiment. The smart control device 30 according to another embodiment may differ from the smart control device 30 according to an embodiment in that the former includes a plurality of input units. The following description of FIG. 5 will be focused on a user interface through the plurality of input units.

According to another embodiment, the input unit 310 may include a plurality of input units. The plurality of input units may include, for example, a first input unit that is rotated like a wheel and a second input unit that is pushed like a button.

According to another embodiment, when the first input unit is operated, the processor 360 may identify a function currently selected through the first input unit. When the second input unit is operated, the processor 360 may transmit information about the function selected through the first input unit and a tag ID to the server 10. The server 10, when receiving the selected function information and the tag ID, may instruct a target device corresponding to the tag ID to perform a function corresponding to the function information.

According to another embodiment, the processor 360 may display, through the output unit 340, information about a function selected through the first input unit. For example, referring to FIG. 5, when the first input unit is operated in a first manner, the processor 360 may display a menu icon "GET UP" for a control function 510 to be performed when a user gets up. When the first input unit is operated in a second manner, the processor 360 may display a menu icon "SLEEP" for a control function 520 to be performed when the user sleeps. When the first input unit is operated in a third manner, the processor 360 may display a menu icon "GO OUT" for a control function 530 to be performed when the user goes out. When the first input unit is operated in a fourth manner, the processor 360 may display a menu icon "COME HOME" for a control function 540 to be performed when the user comes home. When the first input unit is operated fifth, sixth, seventh, and eighth manner, the processor 360 may display a menu icons for a function 550 of selecting a first sound source list, a menu icon for a function 560 of selecting a second sound source list, a menu icon for a function 570 of selecting a third sound source list, and a menu icon for a function 580 of selecting a fourth sound source list. The first to fourth sound source lists may be specified sound source lists. For example, the first to fourth sound source lists may be, for example, new sound sources, pop sound sources, dance music sound sources (techno or electronic dance music (EDM)), or acoustic pop sound sources.

Figure 6:
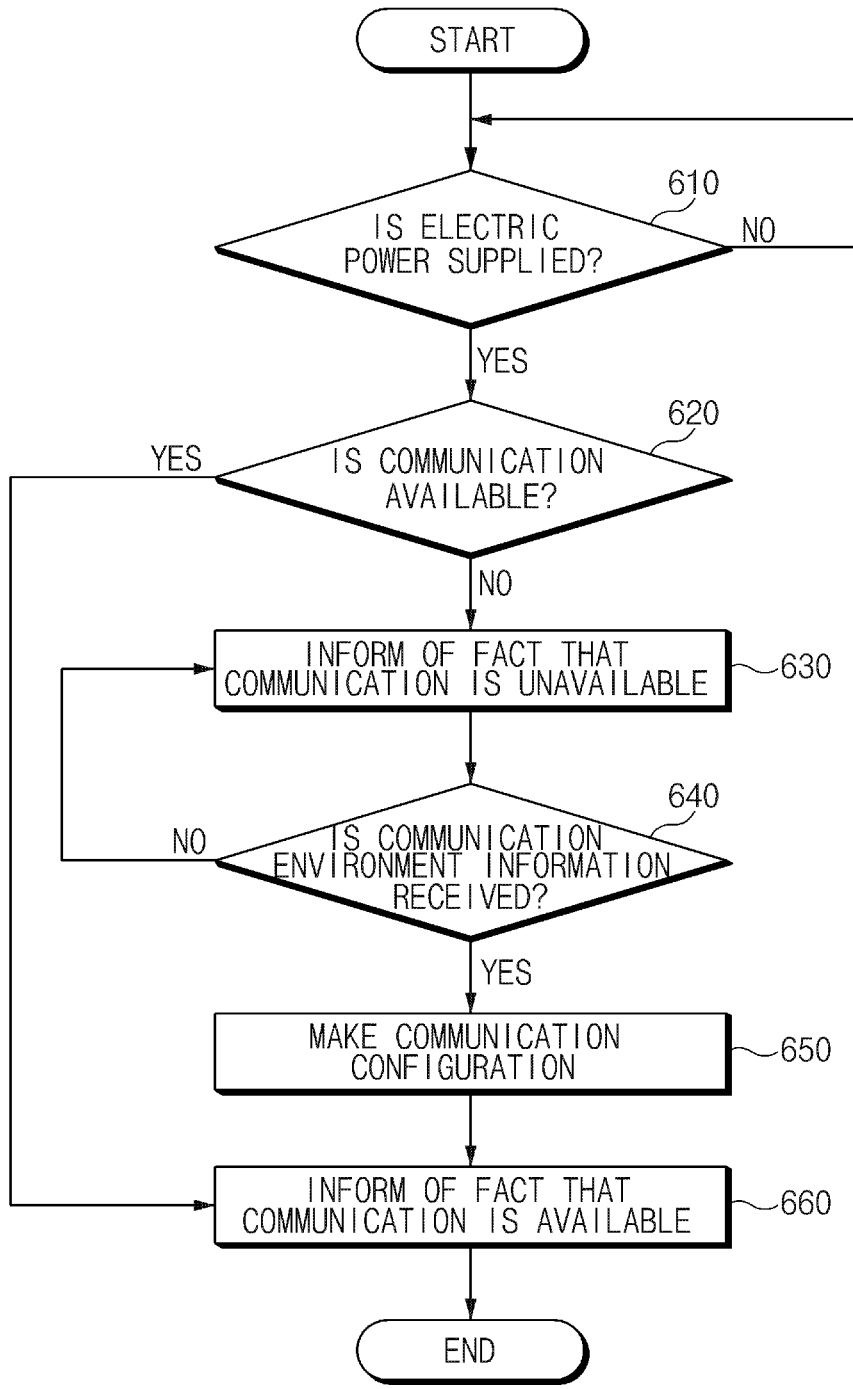
FIG. 6 is a flowchart illustrating a method for making a communication configuration for a smart control device, according to an embodiment.

FIG. 6 is a flowchart illustrating a method for making a communication configuration for a smart control device, according to an embodiment.

Referring to FIG. 6, in operation 610, the processor 360 may be reset when electric power is supplied thereto.

In operation 620, the processor 360 may determine whether communication is available through a specified method (e.g., WiFi). For example, the processor 360 may determine whether an access point capable of WiFi communication exists.

When it is determined that communication is not available, the processor 360 may, in operation 630, inform of the fact that communication is unavailable. The output unit 340 may be, for example, an LED capable of displaying a plurality of colors and may differently display a state in which communication is available and a state in which communication is unavailable, by using a plurality of colors.

In operation 640, the processor 360 may determine whether communication environment information is received. The communication environment information may be, for example, an ID and a password of an access point that provides a WiFi communication service. The communication environment information may be received from the electronic device 40 through NFC communication. When an input for making a communication configuration is received through a specified application, the electronic device 40 may identify communication environment information for WiFi communication. When a user brings the electronic device 40 to a close location to the smart control device 30, the electronic device 40 may transmit the identified communication environment information through NFC communication.

When the determination result in operation 640 shows that the communication environment information is received, the processor 360 may, in operation 650, make a communication configuration for communication with the server 10, based on the communication environment information. When the communication configuration is made, the processor 360 may test whether communication is available.

When the communication configuration is made in operation 650, or when the determination result in operation 620 shows that communication is available, the processor 360 may, in operation 660, inform of the fact that communication is available, by using the output unit 340.

In an embodiment, communication environment information set for an electronic device may be transmitted to the smart control device 30 by operating a menu of an application installed in the electronic device without separately identifying the communication environment information set for the electronic device. Accordingly, it is possible to easily make a communication configuration for the smart control device 30.

Figure 7:
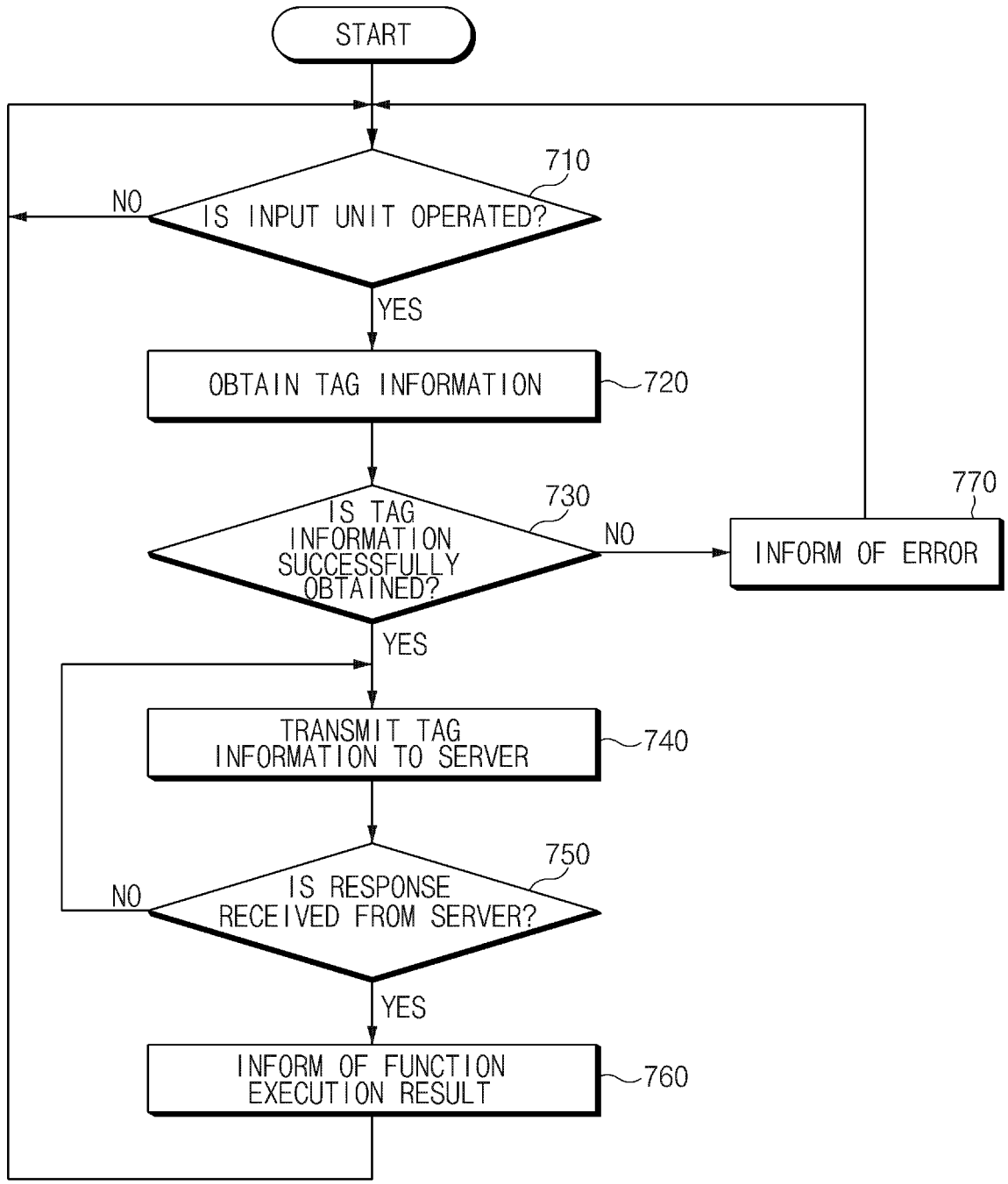
FIG. 7 is a flowchart illustrating a method for performing a function by operating a smart control device, according to an embodiment.

FIG. 7 is a flowchart illustrating a method for performing a function by operating a smart control device, according to an embodiment.

Referring to FIG. 7, in operation 710, the processor 360 may determine whether the input unit 310, such as a button, is operated. For example, the processor 360 may determine whether the button is operated, based on the fact that a logical state (high or low) of a specified signal is changed depending on whether the button is operated.

When detecting the operation of the button, the processor 360 may, in operation 720, via tag transceiver 320 obtain tag information from an NFC tag (e.g., 360). The tag information may include at least one of a tag ID and the address (e.g., URL) of the server 10. The processor 360 may also read tag information from the memory 350 when detecting the operation of the button. In this case, the processor 360 may read the tag information from the tag 50 and may store the tag information in the memory 350 when the tag 50 is attached or when the button is operated for the first time after the attachment of the tag 50.

In operation 730, the processor 360 may determine whether the tag information is successfully obtained after NFC communication. For example, when obtaining the tag information that includes the address of the server 10 and the tag ID, the processor 360 may determine that the tag information is successfully obtained.

When succeeding in obtaining the tag information, the processor 360 may, in operation 740, transmit the tag ID to the server 10 corresponding to the address of the server 10. The server 10, when receiving the tag ID, may instruct a target device specified for the tag ID to execute a function specified for the tag ID.

After transmitting the tag information, the processor 360 may, in operation 750, determine whether a response corresponding to the tag information is received from the server 10. The response may be information representing whether the function corresponding to the tag information is completely performed by the server 10.

When the response corresponding to the tag information is received in operation 750, the processor 360 may, in operation 760, inform of a function execution result. For example, when receiving a response representing completion of the function from the server 10, the processor 360 may inform of the completion of the function through the output unit 340. In another example, when receiving a response representing a failure in execution of the function from the server 10, the processor 360 may inform of the failure in the execution of the function through the output unit 340.

When failing to obtain the tag information in operation 730, the processor 360 may, in operation 770, inform of an error state in which the tag information cannot be obtained, through the output unit 340.

In an embodiment, a function corresponding to a tag attached to the smart control device 30 may be easily performed by transmitting at least a portion of tag information to a server when the smart control device 30 is operated.

Figure 8:
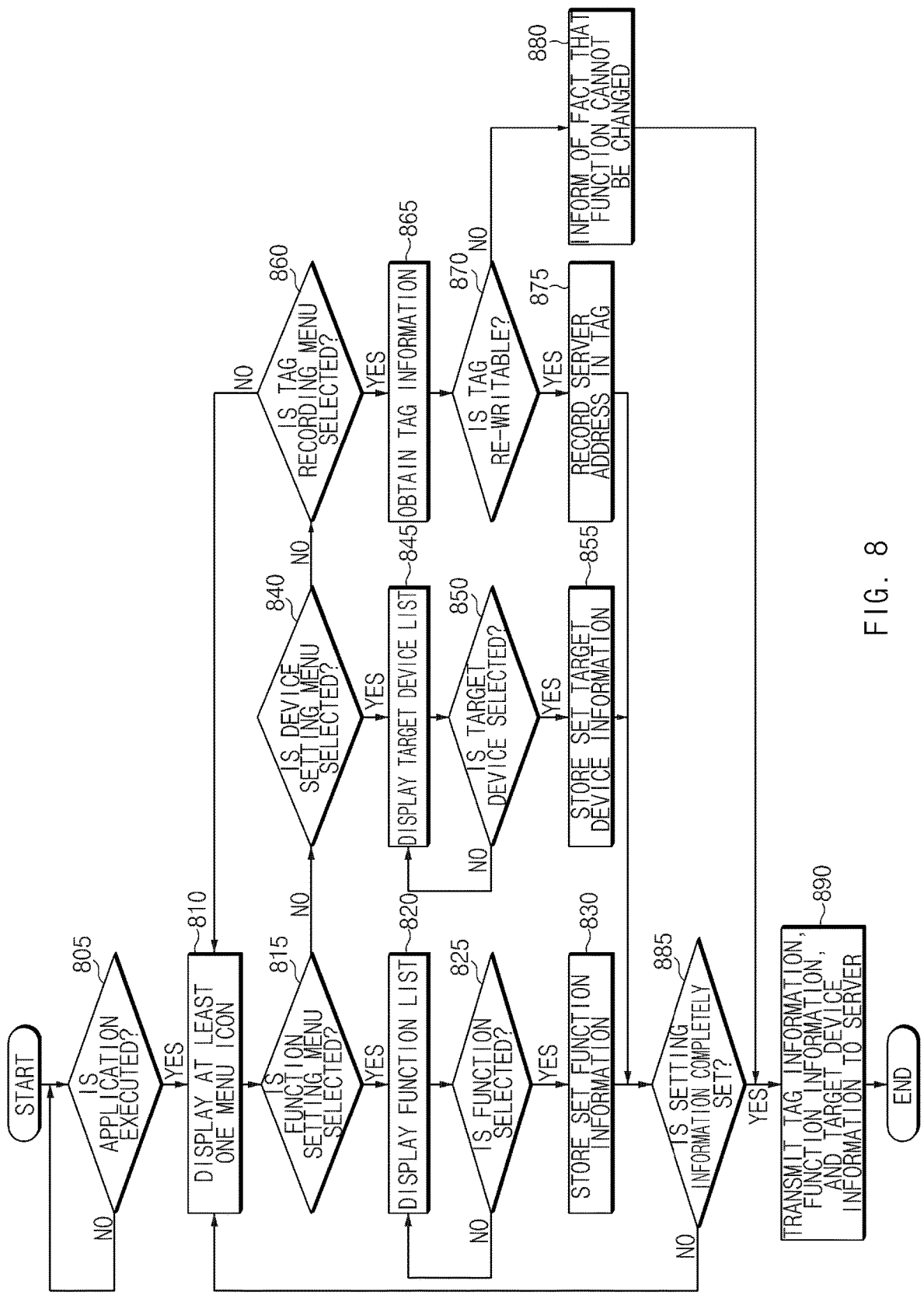
FIG. 8 is a flowchart illustrating a method for setting a function corresponding to a smart control device, according to an embodiment.

FIG. 8 is a flowchart illustrating a method for setting a function corresponding to a smart control device, according to an embodiment.

Referring to FIG. 8, when a specified application is executed in operation 805, the electronic device 40 may, in operation 810, display at least one selectable menu icon. The application may be configured to communicate with the specified function server 10 through a specified target device. The at least one menu icon may include an icon of at least one of a tag recording menu, a function setting menu, and a target-device setting menu. In operation 810, the electronic device 40 may obtain a server address specified for the specified application.

When the function setting menu is selected from the displayed menu icons in operation 815, the electronic device 40 may, in operation 820, display a function list. For example, the electronic device 40 may receive a function list from the server 10 specified for the application and may display the function list.

When a function is selected from the function list in operation 825, the electronic device 40 may, in operation 830, store set function information (e.g., a function ID). The function may be performed when an operation of the smart control device 30 is identified.

When the device setting menu is selected from the menu icons in operation 840, the electronic device 40 may, in operation 845, display a target device list. For example, the electronic device 40 may receive a target device list from the server 10 and may display the received target device list. In another example, when a function is selected, the electronic device 40 may transmit function information of the function to the server 10 and may receive, from the server 10, a list of target devices capable of performing the function.

When a target device is selected from the target device list in operation 850, the electronic device 40 may, in operation 855, store set target-device information (e.g., a target device ID).

When the tag recording menu is selected from the menu icons in operation 860, the electronic device 40 may, in operation 865, obtain tag information from the tag 50 through NFC communication. The tag information may include, for example, a write-flag that represents whether the tag 50 is rewritable. The tag information may further include, for example, a tag ID.

In operation 870, the electronic device 40 may determine whether the tag 50 is re-writable, based on the write-flag included in the obtained tag information. For example, when the write-flag is set to 1, the electronic device 40 may determine that the tag 50 is re-writable.

When it is determined that the tag 50 is re-writable, the electronic device 40 may, in operation 875, record the server address in the tag 50 through NFC communication. For example, the electronic device 40 may identify the server address specified for the application. The electronic device 40, when closely approaching the tag 50, may record the server address in the tag 50 through NFC communication.

When the determination result in operation 870 shows that the tag 50 is not re-writable, the electronic device 40 may, in operation 880, inform of the fact that the function cannot be changed.

In operation 885, the electronic device 40 may determine whether setting information for performing the function corresponding to the tag ID is completely set. For example, the electronic device 40 may determine whether the tag ID, the function specified for the tag ID, and the target device to perform the specified function are all set.

When the determination result in operation 885 shows that the setting information corresponding to the tag ID is set, the electronic device 40 may transmit, to the server 10, the tag ID, the selected function information (the function ID), and the selected target device information (e.g., the target device ID). When receiving the setting information, the server 10 may register the received setting information. When the tag ID is received, the server 10 may instruct the target device 20 specified for the received tag ID to perform the specified function.

Figure 9:
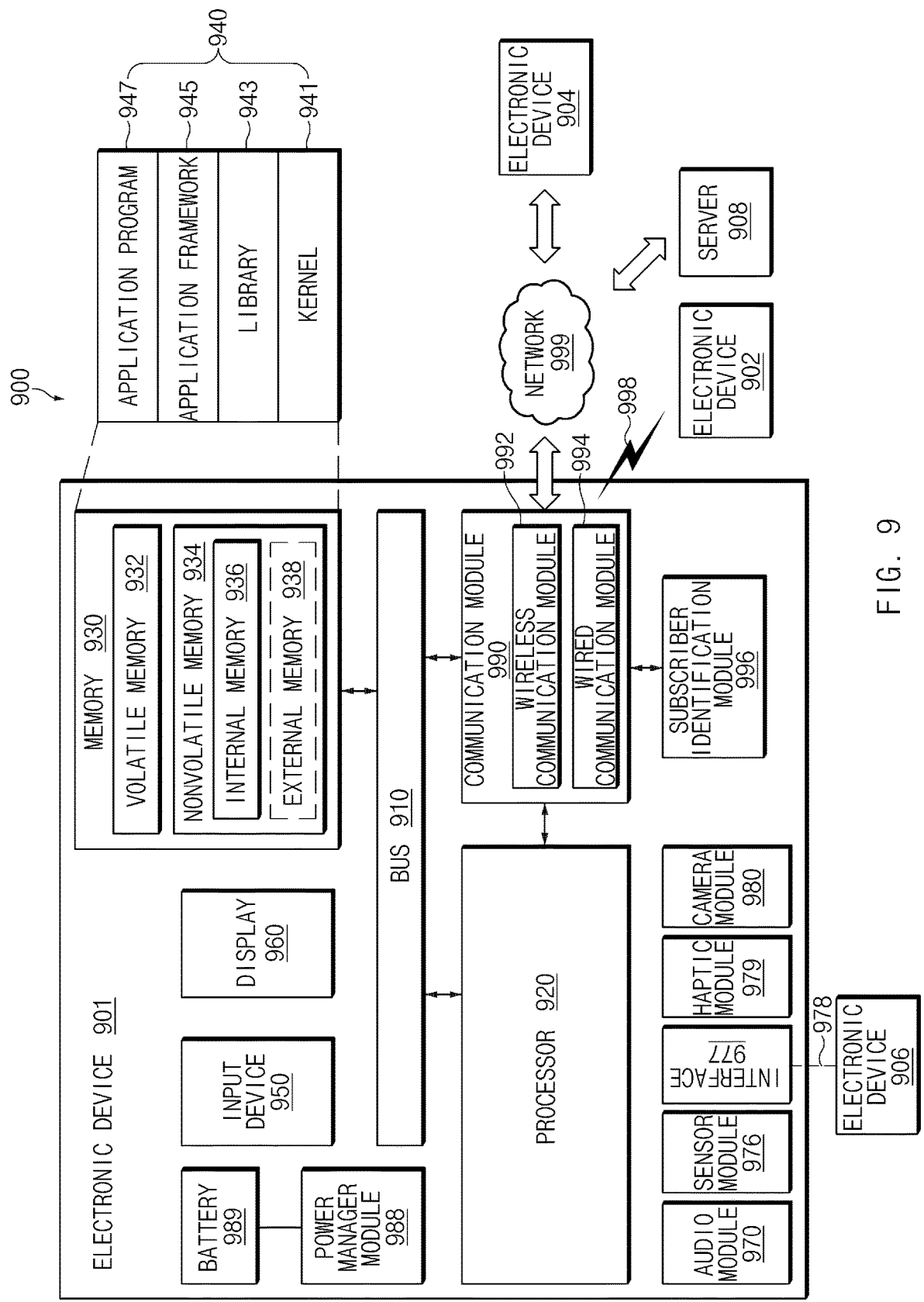
FIG. 9 is a block diagram of a network environment according to an embodiment.

Referring to FIG. 9, under the network environment 900, the electronic device 901 may communicate with an electronic device 902 through local wireless communication 998 or may communication with an electronic device 904 or a server 908 through a network 999. According to an embodiment, the electronic device 901 may communicate with the electronic device 904 through the server 908.

According to an embodiment, the electronic device 901 may include a bus 910, a processor 920 a memory 930, an input device 950, a display 960, an audio module 970, a sensor module 976, an interface 977, a haptic module 979, a camera module 980, a power management module 988, a battery 989, a communication module 990, and a subscriber identification module 996. According to an embodiment, the electronic device 901 may not include at least one of the above-described elements or may further include other element(s).

For example, the bus 910 may interconnect the above-described elements 920 to 990 and may include a circuit for conveying signals between the above-described elements.

The processor 920 may include one or more of a central processing unit (CPU), an application processor (AP), a graphic processing unit (GPU), an image signal processor (ISP) of a camera or a communication processor (CP). According to an embodiment, the processor 920 may be implemented with a system on chip (SoC) or a system in package (SiP). For example, the processor 920 may drive an operating system (OS) or an application to control at least one of another element connected to the processor 920 and may process and compute various data. The processor 920 may load a command or data, which is received from at least one of other elements, into a volatile memory 932 to process the command or data and may store the process result data into a nonvolatile memory 934. Further, the processor 920 may include the intelligence agent 151, the intelligence service module 155, and execution manager module 153 as shown in FIG. 2.

The memory 930 may include, for example, the volatile memory 932 or the nonvolatile memory 934. The volatile memory 932 may include, for example, a random access memory (RAM), a static RAM (SRAM), or a synchronous dynamic RAM (SDRAM)). The nonvolatile memory 934 may include, for example, a one-time programmable read-only memory (OTPROM), a programmable read-only memory (PROM), an erasable programmable read-only memory (EPROM), an electrically erasable programmable read-only memory (EEPROM), a mask ROM, a flash ROM, a flash memory, a hard disk drive, or a solid-state drive (SSD). In addition, the nonvolatile memory 934 may be configured in the form of an internal memory 936 or the form of an external memory 938 which is available through connection only if necessary, according to the connection with the electronic device 901. The external memory 938 may further include a flash drive such as compact flash (CF), secure digital (SD), micro secure digital (Micro-SD), mini secure digital (Mini-SD), extreme digital (xD), a multimedia card (MMC), or a memory stick. The external memory 938 may be operatively or physically connected with the electronic device 901 in a wired manner or a wireless manner.

For example, the memory 930 may store, for example, at least one different software element, such as an instruction or data associated with the program 940, of the electronic device 901. The program 940 may include, for example, a kernel 941, a library 943, an application framework 945 or an application program, 947. The memory 930 may store a first app 141*a* associated with tasks 141*b*, and a second app 143*a* associated with tasks 143*b*.

The input device 950 may include a microphone, a mouse, or a keyboard. According to an embodiment, the keyboard may include a keyboard physically connected or a keyboard virtually displayed through the display 960. The microphone may be configured to receive a voice input.

The display 960 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 901. The display module may be configured to display objects such as the objects of FIGS. 9-17.

The audio module 970 may convert, for example, from a sound into an electrical signal or from an electrical signal into the sound. According to an embodiment, the audio module 970 may acquire sound through the input device 950 or may output sound through an output device (not illustrated) included in the electronic device 901, an external electronic device or an electronic device 906 connected with the electronic device 901

The sensor module 976 may measure or detect, for example, an internal operating state or an external environment state of the electronic device 901 to generate an electrical signal or a data value corresponding to the information of the measured state or the detected state. The sensor module 976 may include, for example, at least one of a gesture sensor, a gyro sensor, a barometric pressure sensor, a magnetic sensor, an acceleration sensor, a grip sensor, a proximity sensor, a color sensor, an infrared sensor, a biometric sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor, or an UV sensor. The sensor module 976 may further include a control circuit for controlling at least one or more sensors included therein. According to an embodiment, the sensor module 976 may be controlled by using the processor 920 or a processor separate from the processor 920. In the case that the separate processor is used, while the processor 920 is in a sleep state, the separate processor may operate without awakening the processor 920 to control at least a portion of the operation or the state of the sensor module 976.

According to an embodiment, the interface 977 may include a high definition multimedia interface (HDMI), a universal serial bus (USB), an optical interface, a recommended standard 232 (RS-232), a D-subminiature (D-sub), a mobile high-definition link (MHL) interface, a SD card/MMC interface, or an audio interface. A connector 978 may physically connect the electronic device 901 and the electronic device 906. According to an embodiment, the connector 978 may include, for example, an USB connector, an SD card/MMC connector, or an audio connector.

The haptic module 979 may convert an electrical signal into mechanical stimulation or into electrical stimulation. For example, the haptic module 979 may apply tactile or kinesthetic stimulation to a user. The haptic module 979 may include, for example, a motor, a piezoelectric element, or an electric stimulator.

The camera module 980 may capture, for example, a still image and a moving picture. According to an embodiment, the camera module 980 may include at least one lens, an image sensor, an image signal processor, or a flash.

The power management module 988, which is to manage the power of the electronic device 901, may constitute at least a portion of a power management integrated circuit (PMIC).

The battery 989 may include a primary cell, a secondary cell, or a fuel cell and may be recharged by an external power source to supply power at least one element of the electronic device 901.

The communication module 990 may establish a communication channel between the electronic device 901 and an external device. The communication module 990 may support wired communication or wireless communication through the established communication channel. According to an embodiment, the communication module 990 may include a wireless communication module 992 or a wired communication module 994. The communication module 990 may communicate with the external device through a first network 998 or a second network 999 through a relevant module among the wireless communication module 992 or the wired communication module 994.

The wireless communication module 992 may support, for example, cellular communication, local wireless communication, and global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 992 supports cellular communication, the wireless communication module 992 may, for example, identify or authenticate the electronic device 901 within a communication network using the subscriber identification module 996. According to an embodiment, the wireless communication module 992 may include a communication processor (CP) separate from the processor 2820. In this case, the communication processor may perform at least a portion of functions associated with at least one of elements 910 to 996 of the electronic device 901 in substitute for the processor 920 when the processor 920 is in an inactive (sleep) state, and together with the processor 920 when the processor 920 is in an active state. According to an embodiment, the wireless communication module 992 may include a plurality of communication modules, each supporting only a relevant communication scheme among cellular communication, short-range wireless communication, or a GNSS communication scheme. The wireless communications module 992 may transmit voice data to an intelligence server 200 and receive a sequence of tasks from the intelligence server 200.

The wired communication module 994 may include, for example, include a local area network (LAN) service, a power line communication, or a plain old telephone service (POTS).

For example, the first network 998 may employ, for example, Wi-Fi direct or Bluetooth for transmitting or receiving instructions or data through wireless direct connection between the electronic device 901 and the first external electronic device 902. The second network 999 may include a telecommunication network for transmitting or receiving instructions or data between the electronic device 901 and the second electronic device 904. The first network 998 can include the intelligence server 200.

According to embodiments, the instructions or the data may be transmitted or received between the electronic device 901 and the second external electronic device 904 through the server 908 connected with the second network. Each of the external first and second external electronic devices 902 and 904 may be a device of which the type is different from or the same as that of the electronic device 901. According to various embodiments, all or a part of operations that the electronic device 901 will perform may be executed by another or a plurality of electronic devices. According to an embodiment, in the case that the electronic device 901 executes any function or service automatically or in response to a request, the electronic device 901 may not perform the function or the service internally, but may alternatively or additionally transmit requests for at least a part of a function associated with the electronic device 901 to any other device. The other electronic device may execute the requested function or additional function and may transmit the execution result to the electronic device 901. The electronic device 901 may provide the requested function or service using the received result or may additionally process the received result to provide the requested function or service. To this end, for example, cloud computing, distributed computing, or client-server computing may be used.

Figure 10:
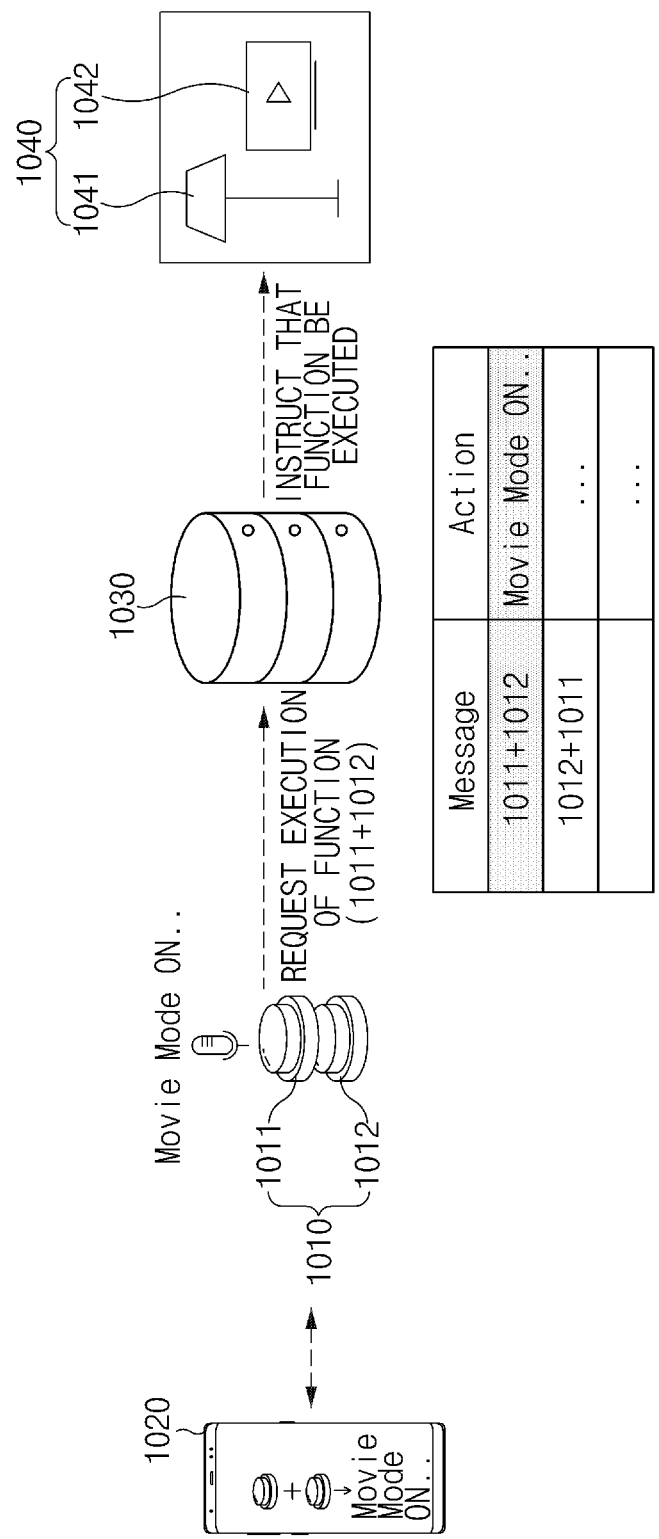
FIG. 10 illustrates a configuration of an integrated control system according to an embodiment.

FIG. 10 illustrates a configuration of an integrated control system according to an embodiment. According to certain embodiments, a first control device 1011 can be capable of performing a first function in response to a user input. However, when connected to a second control device 1012, an input to the first control device 1011 causes performing a second function.

Referring to FIG. 10, an integrated control system 1000 according to an embodiment may include an integrated control device 1010, a user terminal 1020, a server device 1030, and a target device 1040. In an embodiment, some elements may be omitted, or additional elements may be further included. In an embodiment, some of the elements may be combined together to form one object, but the object may identically perform the functions of the corresponding elements before the combination. Input/output relationships illustrated in FIG. 10 are merely illustrative for the convenience of description, and the present disclosure is not limited thereto.

According to an embodiment, the integrated control device 1010 may include a first control device 1011 and a second control device 1012. The first control device 1011 and the second control device 1012, when not being combined together, may be associated with a first function of a first target device 1041 and a second function of a second target device 1042. The first control device 1011 and the second control device 1012 may be associated with a third function when combined together (e.g., electrically connected together) to form the integrated control device 1010. For example, when the first control device 1011 is operated (e.g., pushed like a button or rotated like a wheel) by a user without being combined with the second control device 1012, the first control device 1011 may transmit, to the server device 1030, a message associated with a request for execution of the first function of the first target device 1041. When the second control device 1012 is operated (e.g., pushed) by the user without being combined with the first control device 1011, the second control device 1012 may transmit, to the server device 1030, a message associated with a request for execution of the second function of the second target device 1042. In another example, when the first control device 1011 and the second control device 1012 combined together to form the integrated control device 1010 are operated by the user, the integrated control device 1010 may transmit, to the server device 1030, a message associated with a request for execution of the third function of the target device 1040.

According to an embodiment, one of the first and second control devices 1011 and 1012, which are included in the integrated control device 1010, may operate as a main control device and the other may operate as a sub-control device under instruction of the server device 1030. The main control device may be, for example, a control device (e.g., 1011) located at an upper position or a control device (e.g., 1012) located at a lower position, among the control devices (e.g., 1011 and 1012) combined together. The main control device may be determined based on the sequence in which the main control device is combined with the sub-control device. For example, each control device may operate as a main control device in the case where the control device has no control device on the top side thereof and has a control device on the bottom side thereof, and each control device may operate as a sub-control device in the case where the control device has a control device on the top side thereof, regardless of whether the control device has a control device on the bottom side thereof. The main control device may transmit and receive a signal with the sub-control device to identify the sequence in which the first control device 1011 and the second control device 1012 are connected in a specified direction (e.g., from top to down) and may transmit, to the server device 1030, a message associated with requesting third function information corresponding to the connection sequence. In the case where the main control device includes an output device, the main control device may output, through the output device (e.g., a speaker), screen information that informs the user that the main control device is a control device associated with execution of the third function, when the main control device receives the third function information from the server device 1030. The main control device may transmit, to the server device 1030, a message associated with a request for execution of the third function when receiving a user input associated with execution of a specified function. The user input may be received from an input device of the main control device or from the sub-control device. The main control device may perform wired communication with the sub-control device, and the integrated control device 1010 may perform specified wireless communication with the user terminal 1020 or the server device 1030. According to various embodiments, the control devices included in the integrated control device 1010 may be combined together horizontally rather than vertically.

According to an embodiment, the user terminal 1020 may have an app installed therein for making a communication configuration between the integrated control device 1010 and the server device 1030 and setting functions of the integrated control device 1010. The app may provide an interface for entering connection information (e.g., an ID and a password) of an access point that each of the control devices (e.g., 1011 and 1012) has to access for communication with the server device 1030. For example, the user may set a communication path for the first and second control devices 1011 and 1012 through the app in the case where the first control device 1011 or the second control device 1012 cannot access the server device 1030. The app may provide, for example, an interface for requesting the server device 1030 to set or modify at least one of the first function, the second function of a second input device of the second control device 1012, and the third function. Accordingly, the user may send a message to the server device 1030 through the app to make a request to modify at least one of the first function, the second function, and the third function, and in response to the message, the server device 1030 may instruct a control device corresponding to the at least one function to modify the function. The user terminal 1020 may communicate with the first control device 1011 and the second control device 1012 through a specified communication method. The specified communication method may include at least one of, for example, WiFi and Bluetooth communication. The user terminal 1020 may communicate with the server device 1030 through the specified communication method or another communication method (e.g., 3G, 4G, or 5G). The user terminal 1020 may include at least one of, for example, a portable communication device (e.g., a smartphone), a computer device, a portable multimedia device, a portable medical device, a camera, a wearable device, and a home appliance. However, the user terminal 1020 is not limited to the aforementioned devices.

According to an embodiment, the server device 1030 may store mapping information between a connection sequence of the control devices and an execution function. For example, the server device 1030 may store the third function information mapped with the connection sequence of the first control device 1011 and the second control device 1012 in a specified direction (e.g., from top to down) and fourth function information mapped with the connection sequence of the second control device 1012 and the first control device 1011 in the specified direction. The server device 1030 may additionally store mapping information between functions associated with identification information of the first control device 1011 and identification information of the second control device 1012.

When the server device 1030 receives, from the main control device, information about the connection sequence of the first control device 1011 and the second control device 1012 in the specified direction, the server device 1030 may determine that the first control device 1011 and the second control device 1012 are combined to form the integrated control device 1010 and may transmit the third function information corresponding to the connection sequence identified based on the mapping information, to at least one of the main control device and the user terminal 1020. When receiving a message associated with a request for execution of the third function from the main control device, the server device 1030 may transmit a message to the target device 1040 corresponding to the third function to instruct the target device 1040 to execute the third function. The server device 1030 may communicate with the first control device 1011 and the second control device 1012 through a specified communication method (e.g., WiFi).

In the state in which the first control device 1011 and the second control device 1012 are not connected with each other, the server device 1030 may instruct that functions corresponding to the first and second control devices 1011 and 1012 be executed. For example, when receiving a message associated with a request for execution of the first function from the first control device 1011, the server device 1030 may instruct the first target device 1041 to execute the first function. In another example, when receiving a message associated with a request for execution of the second function from the second control device 1012, the server device 1030 may instruct the second target device 1042 to execute the second function.

According to an embodiment, when the target device 1040 receives, from the server device 1030, an instruction to execute at least one of the first to third functions, the target device 1040 may perform a function corresponding to the received instruction. The target device 1040 may communicate with the server device 1030 through a specified communication method (e.g., WiFi). For example, the first target device 1041 may execute the first function when instructed to execute the first function. The second target device 1042 may execute the second function when instructed to execute the second function. In another example, the first target device 1041 and the second target device 1042 may execute the third function when instructed to execute the third function. The third function may include, for example, a function of simultaneously executing the first function and the second function (a first case), a function different from the first function and the second function (a second case), or a function of executing the first function and the second function by making an association therebetween (a third case). For example, the first function may be a function of reproducing/ending contents, and the second function may be a function of turning on/off a light. In the first case, the third function may be a function of simultaneously executing a function of reproducing specified music and a function of turning on a light. In the second case, the third function may be a function of reproducing specified music and simultaneously making a light blink (turned on/off) depending on the sound of the reproduced music. In the third case, the third function may be a function of turning on a light at brightness corresponding to the genre of reproduced music. According to the above-described embodiments, the plurality of control devices 1011 and 1012 may be connected to form the integrated control device 1010 that is capable of easily executing different functions, and the integrated control device 1010 may be used to execute various functions.

Figure 11A:
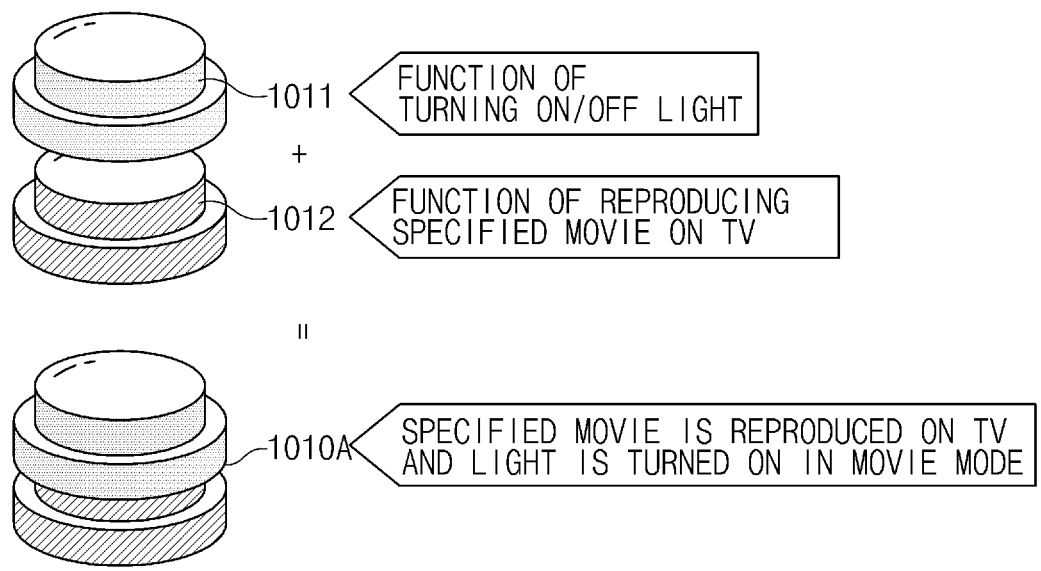
FIG. 11A and FIG. 11B are views for explaining a change in function settings that corresponds to a sequence in which control devices are connected together, according to an embodiment.
Figure 11B:
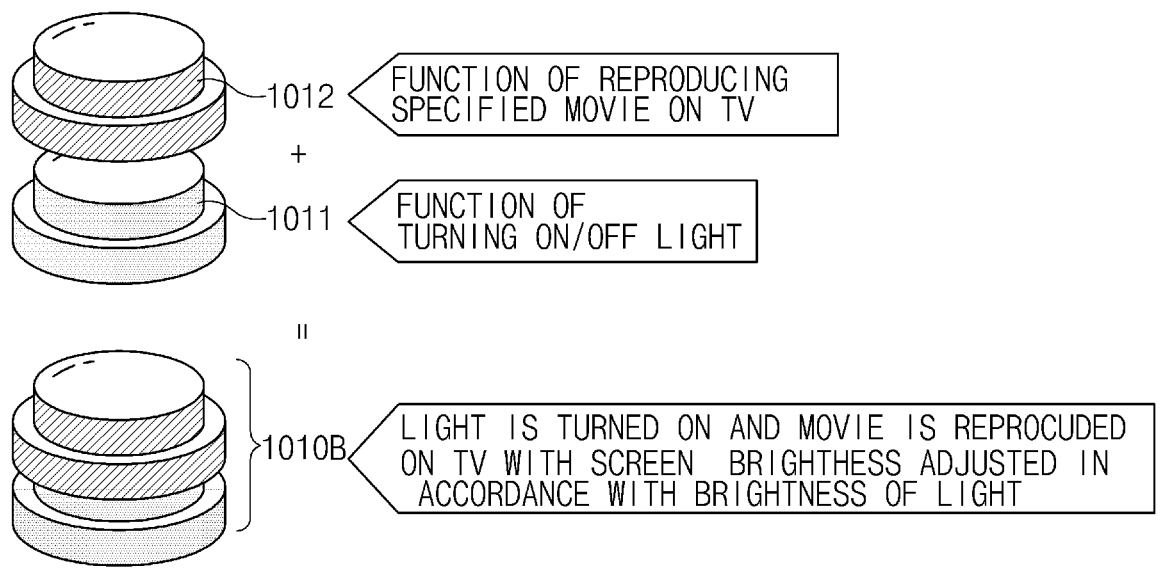

FIGS. 11A and 11B are views for explaining a change in function settings that corresponds to a sequence in which control devices are connected together, according to an embodiment. In FIGS. 11A and 11B, the control device located at a lower position, among control devices, operates as a main control device and a third function corresponds to a function of associating and executing a first function and a second function, although it shall be understood that other configuration are possible.

Referring to FIGS. 11A and 11B, according to an embodiment, the first button 1011 may be associated with a function of turning on/off the first target device 1041 (e.g., a light), and the second control device 1012 may be associated with a function of reproducing a specified movie on the second target device 1042 (e.g., TV). The server device 1030 may instruct that the first target device 1041 be turned on, when the server device 1030 receives a request message for executing a function of turning on a light from the first control device 1011 according to a user operation for the first control device 1011 in the state in which the first control device 1011 is not combined with the second control device 1012. The server device 1030 may instruct the second target device 1042 (e.g., TV) to reproduce a specified movie, when the server device 1030 receives a request message for executing a function of reproducing the specified movie from the second control device 1012 according to a user operation for the second control device 1012 in the state in which the second control device 1012 is not combined with the first control device 1011.

According to an embodiment, in the state in which the first control device 1011 and the second control device 1012 are combined (e.g., electrically connected) together to form an integrated control device 1010A, the server device 1030 may identify a function corresponding to a sequence in which the first control device 1011 and the second control device 1012 are connected together, based on mapping information and may instruct the target device 1040 to perform the function corresponding to the connection sequence when a user operates the integrated control device 1010A.

Referring to FIG. 11A, a main control device of the integrated control device 1010A, in which the first control device 1011 and the second control device 1012 are connected in a serial order from top to down, may report to the server device 1030 on information about the connection sequence of the integrated control device 1010A. When receiving the connection sequence information of the integrated control device 1010A, the server device 1030 may determine that a third function is associated with the integrated control device 1010A, based on mapping information. The third function may be, for example, a function of reproducing a specified movie on TV (e.g., 1042 of FIG. 10) and turning on a light in a movie mode. When the user operates the integrated control device 1010A (e.g., the first control device 1011 located at a higher position), the integrated control device 1010A may transmit a message associated with a request for execution of the third function that corresponds to the connection sequence. The server device 1030 may instruct TV (e.g., 1042 of FIG. 10) to reproduce a specified movie and a light (e.g., 1041 of FIG. 10) to be turned on in a movie mode, when the server device 1030 receives the message associated with the request for execution of the third function from the integrated control device 1010A operated by the user. Turning on the light in the movie mode may correspond to, for example, turning down the light 1042 to a specified brightness level or lower.

Referring to FIG. 11B, a main control device of an integrated control device 1010B, in which the second control device 1012 and the first control device 1011 are connected in a serial order from top to down, may transmit information about the connection sequence of the integrated control device 1010B to the server device 1030. When receiving the connection sequence information of the integrated control device 1010B from the integrated control device 1010B, the server device 1030 may determine that a fourth function is associated with the integrated control device 1010B, based on mapping information. When the user operates the integrated control device 1010B, the integrated control device 1010B may transmit a message associated with a request for execution of the fourth function that corresponds to the connection sequence. The server device 1030 may instruct the light 1041 to be turned on and the TV 1042 to reproduce a movie by adjusting the brightness of a screen in accordance with the brightness of the light 1041, when the server device 1030 receives the message associated with the request for execution of the fourth function from the integrated control device 1010B operated by the user.

Figure 12:
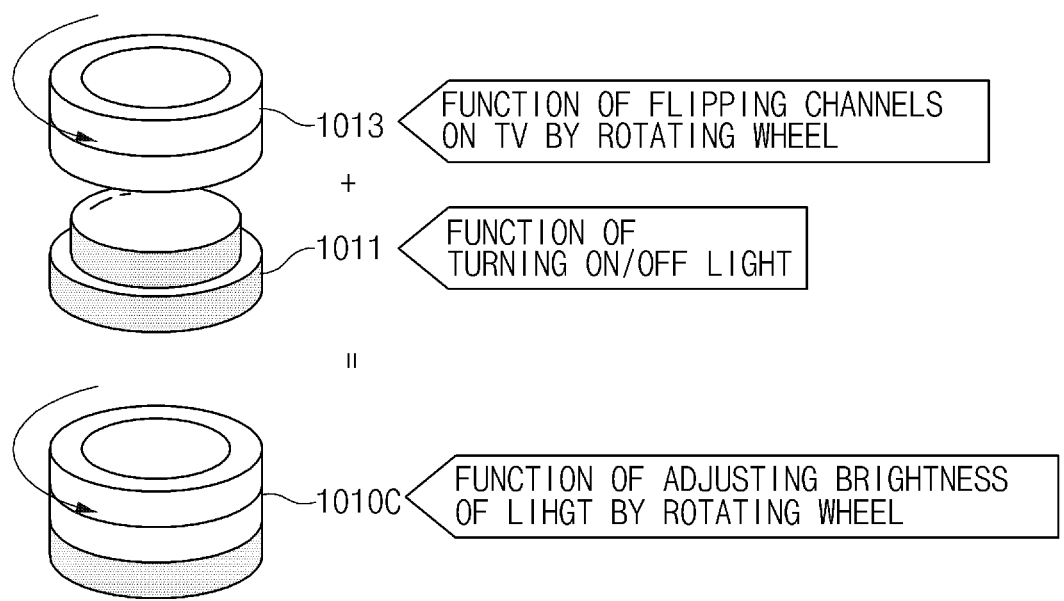
FIG. 12 illustrates an integrated control device in which control devices operated by different methods are connected together, according to an embodiment.

FIG. 12 illustrates an integrated control device in which control devices operated by different methods are connected together, according to an embodiment. A control device having a main control device located at a lower position thereof will be shown in FIG. 12.

Referring to FIG. 12, according to an embodiment, the first control device 1011 may be associated with a function of turning on/off the first target device (e.g., a light) and may be pushed like a button. A second control device 1013 may be associated with a function of flipping channels on TV and may be operated by rotating a wheel.

According to an embodiment, an integrated control device 1010C in which the first control device 1011 is connected to a lower portion of the second control device 1013 may transmit, to the server device 1030, information about a sequence in which the second control device 1013 and the first control device 1011 are connected in a serial order from top to down. Based on mapping information, the server device 1030 may determine that a third function (e.g., adjusting the brightness of a light) is associated with the integrated control device 1010C, when the server device 1030 receives, from the integrated control device 1010C, the information about the sequence in which the second control device 1013 and the first control device 1011 are connected in a serial order from top to down. For example, when determining that the wheel is rotated, the integrated control device 1010C may transmit, to the server device 1030, a message associated with a request for execution of the third function, for example, a function of adjusting brightness according to the direction in which the wheel is rotated. The server device 1030 may instruct a light to increase or decrease brightness according to the rotating direction of the wheel, when the server device 1030 receives the message associated with the request for execution of the function of adjusting brightness.

Figure 13:
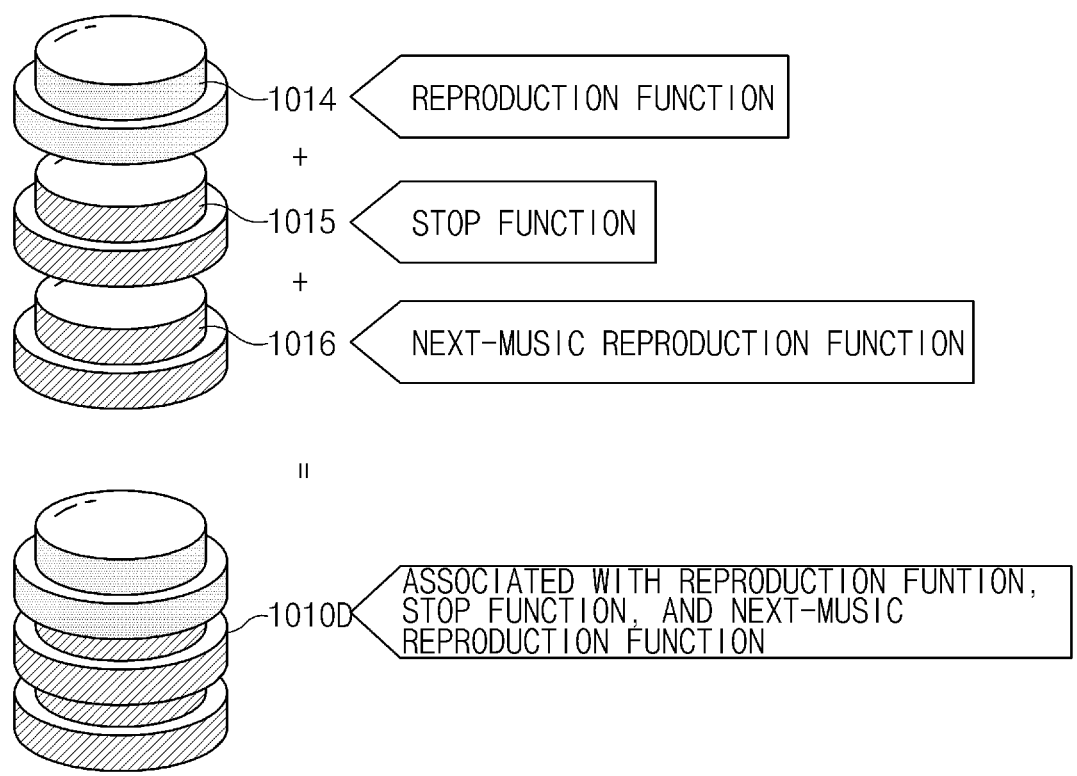
FIG. 13 illustrates an integrated control device in which three control devices are connected together, according to an embodiment.

FIG. 13 illustrates an integrated control device in which three control devices are connected together, according to an embodiment.

Referring to FIG. 13, according to an embodiment, a first control device 1014, a second control device 1015, and a third control device 1016 may be associated with a reproduction function, a stop function, and a next-music reproduction function for specified contents of a fourth reproduction device.

According to an embodiment, an integrated control device 1010D in which the fourth control device 1014, the fifth control device 1015, and the sixth control device 1016 are connected in a serial order from top to down may be associated with the reproduction function, the stop function, and the next-music reproduction function. For example, when detecting a user's operation, the integrated control device 1010D may transmit, to the server device 1030, a message associated with a request for execution of a function corresponding to the number of times the user operates the integrated control device 1010D. In another example, the integrated control device 1010D may repeat an operation of transmitting a message associated with a request for execution of the reproduction function to the server device 1030 when detecting the user's first operation, an operation of transmitting a message associated with a request for execution of the stop function to the server device 1030 when detecting the user's second operation, and an operation of transmitting a message associated with a request for execution of the next-music reproduction function to the server device 1030 when detecting the user's third operation.

Figure 14:
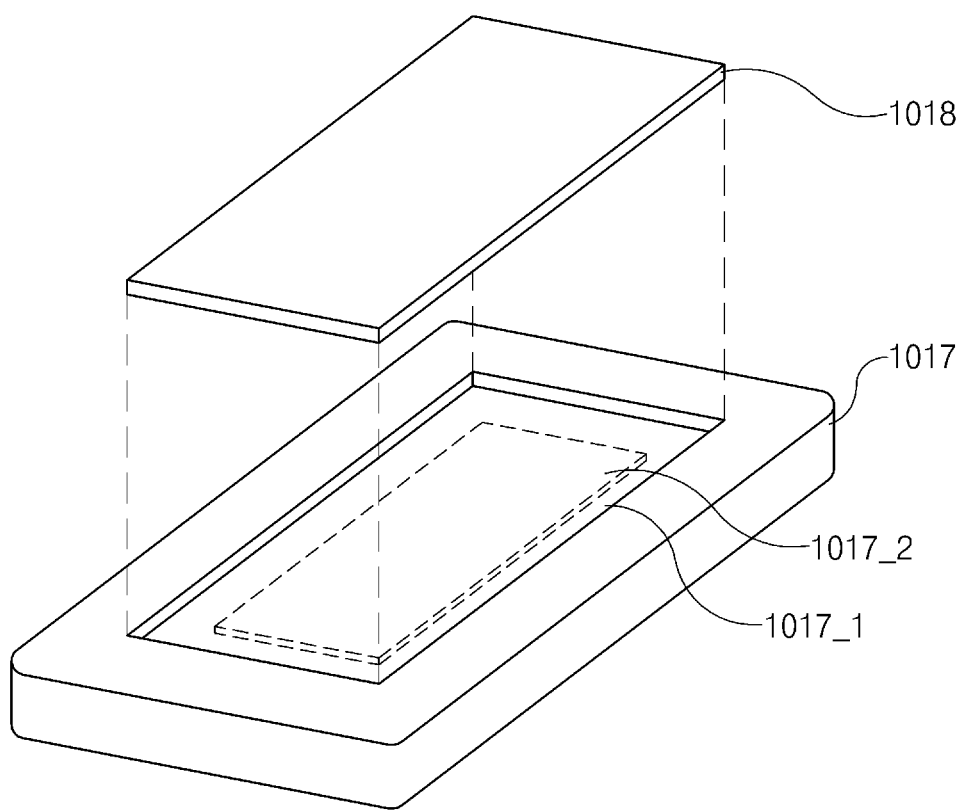
FIG. 14 illustrates a control device combined with a tag, according to an embodiment.

FIG. 14 illustrates a control device combined with a tag, according to an embodiment.

Referring to FIG. 14, according to an embodiment, a control device 1017 may be associated with a function of a target device depending on a tag 1018. For example, the control device 1017 may include a coupling member 1017_1 from which the tag 1018 is detachable and a reader 1017_2. When the tag 1018 is attached to the coupling member 1017_1, the control device 1017 may obtain identification information of the tag 1018 through the reader 1017_2 and may transmit the obtained identification information to the server device 1030. Then, the server device 1030 may transmit function information corresponding to the identification information of the tag 1018 to the control device 1017. The control device 1017 may receive the function information and may store the function information in a memory. When detecting a user operation, the control device 1017 may transmit, to the server device 1030, a message associated with a request for execution of a function corresponding to the identification information of the tag 1018. When the server device 1030 receives the message associated with the request for execution of the function from the control device 1017, the server device 1030 may instruct the target device to perform the function. The function may be a function corresponding to the tag 1018. In the case where the tag 1018 is replaced, the target device associated with the control device 1017 and the function to be executed may be changed. According to various embodiments, the control device 1017 may include a plurality of coupling members 1017_1 from which a plurality of tags 1018 are detachable. The control device 1017 may be configured to perform a different function distinguished from functions corresponding to the respective tags when a user operation is detected in the state in which the plurality of tags 1018 are attached to the plurality of coupling members 1017_1. According to various embodiments, the control device 1017 may be configured to obtain information of a plurality of tags. For example, the control device 1017 may include a plurality of readers and may obtain information of the plurality of tags through the plurality of readers. The tag 1018 may include at least one of, for example, an NFC tag and an RFID tag.

Figure 15:
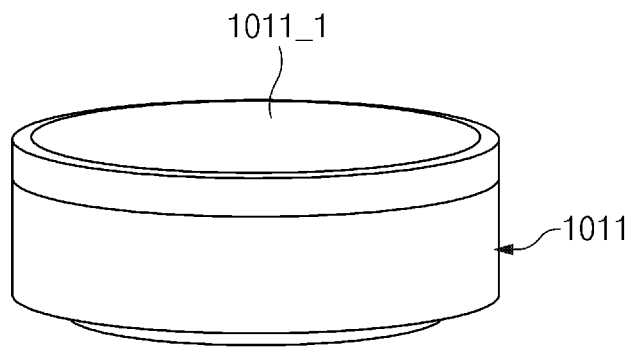
FIG. 15 illustrates a control device including a display, according to an embodiment.

FIG. 15 illustrates a control device including a display, according to an embodiment.

Referring to FIG. 15, according to an embodiment, the first control device 1011 may include, for example, a display 1011_1 at the top of the first control device 1011. In the case where the first control device 1011 includes the display 1011_1, the first control device 1011 may output, on the display 1011_1, information about a function to be executed when a user operates the first control device 1011. The function information may include at least one of, for example, text and an image that inform of function information. In the case where another control device (e.g., 1012 of FIG. 11A) is connected to the first control device 1011 to form an integrated control device (e.g., 1010A of FIG. 11A), the integrated control device (e.g., 1010A of FIG. 11A) may display, through the display 1011_1, function information received from the server device 1030. According to various embodiments, the first control device 1011 may further include a speaker and may output function information through the speaker.

Figure 16:
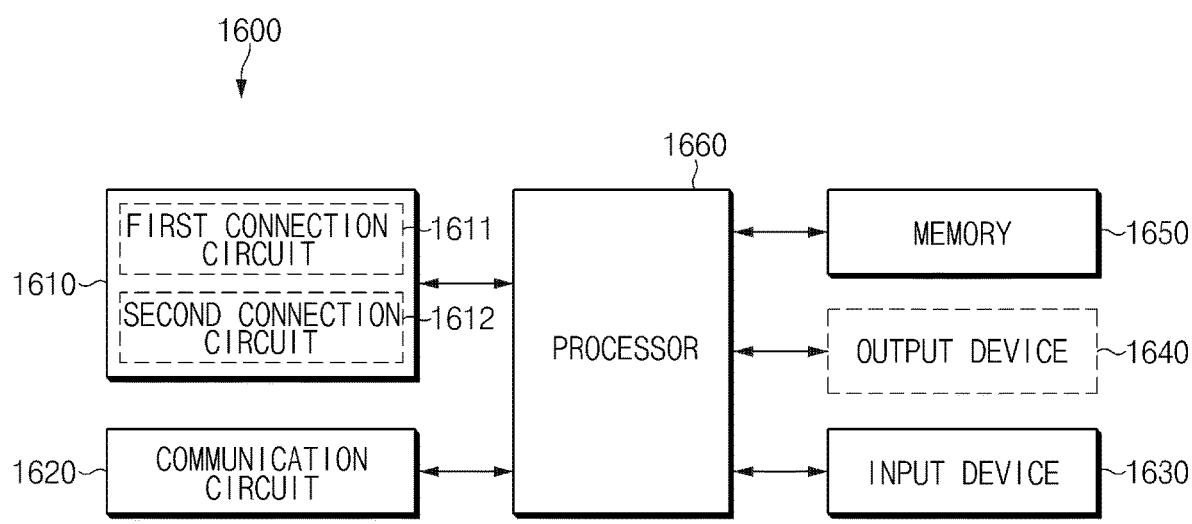
FIG. 16 illustrates a configuration of a first control device according to an embodiment.
Figure 17:
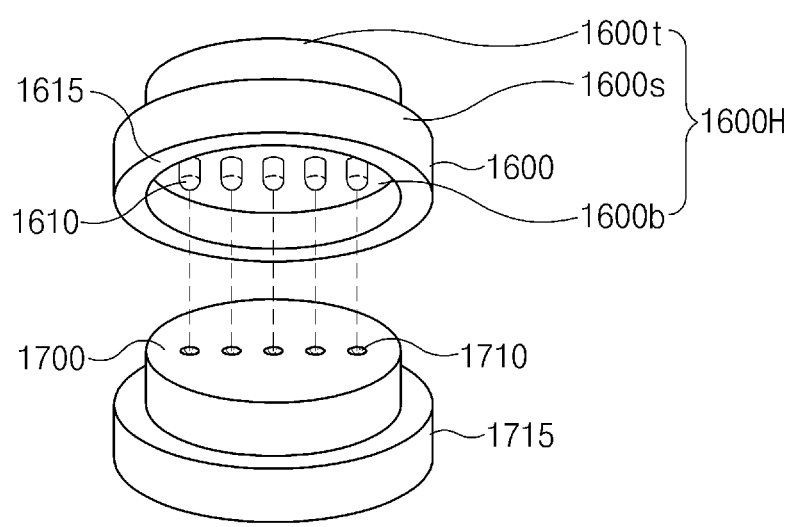
FIG. 17 illustrates a connection structure between a first control device and a second control device, according to an embodiment.

FIG. 16 illustrates a configuration of a first control device according to an embodiment. FIG. 17 illustrates a connection structure between a first control device and a second control device, according to an embodiment.

Referring to FIG. 16, according to an embodiment, a first control device 1600 may include a connection circuit 1610, a communication circuit 1620, an input device 1630, an output device 1640, a memory 1650, and a processor 1660. In an embodiment, some elements may be omitted, or additional elements may be further included. For example, the output device 1640 may be omitted. In an embodiment, some of the elements may be combined together to form one object, but the object may identically perform the functions of the corresponding elements before the combination. Input/output relationships illustrated in FIG. 16 are merely illustrative for the convenience of description, and the present disclosure is not limited thereto.

Referring to FIG. 17, according to an embodiment, the first control device 1600 may operate as a main control device or a sub-control device, depending on a sequence in which the first control device 1600 is connected with a second control device 1700. For example, according to the rule that the uppermost control device of an integrated control device (e.g., 1010A of FIG. 11A) is determined as a main control device, the first control device 1600 may operate as a main control device and the second control device 1700 may operate as a sub-control device in the case where the first control device 1600 and the second control device 1700 are connected in a serial order from top to down. In contrast, in the case where the second control device 1700 and the first control device 1600 are connected in a serial order from top to down, the second control device 1700 may operate as a main control device and the first control device 1600 may operate as a sub-control device. In another example, according to the rule that the lowermost control device of an integrated control device (e.g., 1010A of FIG. 11A) is determined as a main control device, the reverse is possible. In the following description, it will be shown that the uppermost control device operates as a main control device.

According to an embodiment, the connection circuit 1610 may be electrically connected with a connection circuit 1710 included in the second control device 1700. The connection circuit 1610 may include a first connector 1610 that is able to be connected with the second connector 1710 included in the second control device 1700, and the first control device 1600 and the second control device 1700 may be electrically connected with each other by interconnecting the first connector 1610 and the second connector 1710. At least one of the first connector 1610 and the second connector 1710 may include, for example, pogo pins. In another example, the connection circuit 1610 may support communication of a specified scheme between the first control device 1600 and the second control device 1700. The specified communication may include, for example, USB, UART, I2S, or the like. According to various embodiments, a first magnetic member 1615 may be disposed on or around the connection circuit 1610 to fix the first control device 1600 and the second control device 1700 together. For example, the first control device 1600 may include the first magnetic member 1615, the second control device 1700 may include a second magnetic member 1715, and the first control device 1600 may be secured to the second control device 1700 through the first magnetic member 1615 and the second magnetic member 1715. According to various embodiments, the first control device 1600 may include a plurality of connection circuits 1610. For example, in the case where the first control device 1600 is combined downwards or upwards, the connection circuit 1610 may include a first connection circuit 1611 disposed on an upper portion of the first control device 1600 and a second connection circuit 1612 disposed on a lower portion of the first control device 1600. In this disclosure, it will be shown that the connection circuit 1610 includes the first and second connection circuits 1611 and 1612. According to an embodiment, the first control device 1600 may include a housing 1600H that includes a first surface 1600*t* (e.g., a top surface), a second surface 1600*b* (e.g., a bottom surface) that faces away from the first surface 1600*t*, and a side surface 1600*s* that surrounds a space between the first surface 1600*t* and the second surface 1600*b*. For example, in the case where the first surface 1600*t* and the second surface 1600*b* have a circular shape, the side surface 1600*s* may be a curved surface that surrounds a space between the periphery of the first surface 1600*t* and the periphery of the second surface 1600*b*. In another example, in the case where the first surface 1600*t* and the second surface 1660*r* have a rectangular shape, the side surface 1600*s* may be implemented in a shape similar to four side surfaces of a rectangular parallelepiped.

According to an embodiment, the communication circuit 1620, the processor 1660, and the memory 1650 may be arranged inside the housing 1600H. The connection circuit 1610 may be exposed through a portion of at least one of the first surface 1600*t* and the second surface 1600*b*. For example, the first connection circuit 1611 may be exposed through a portion of the first surface 1600*t*, and the second connection circuit 1612 may be exposed through a portion of the second surface 1600*b*. The input device 1630 may be exposed through a portion of the first surface 1600*t*. The output device 1640 may be disposed inside the housing 1600H, or may be exposed through a portion of the first surface 1600*t*. For example, in the case where the output device 1640 is a speaker, the output device 1640 may be disposed inside the housing 1600H. In another example, in the case where the output device 1640 is a display, the first surface 1600*t* may include a substantially transparent area for exposing a part of the output device 1640, and a part of the output device 1640 may be exposed through the transparent area (see FIG. 15).

Referring to FIG. 16, according to an embodiment, the communication circuit 1620 may establish a communication channel through which to communicate with the server device 1030. The communication circuit 1620 may communicate with the server device 1030 by using, for example, short-range communication (e.g., WiFi). For example, the server device 1030 may provide information about a function associated with the first control device 1600, or in response to a request of the first control device 1600, the server device 1030 may instruct a target device for executing the function associated with the first control device 1600 to execute the corresponding function. The communication circuit 1620 may communicate with the user terminal 1020. The user terminal 1020 may have an app installed therein for setting a communication path between the first control device 1600 and the server device 1030 or setting or changing a function associated with the first control device 1600.

According to an embodiment, the input device 1630, when operated by a user, may output a user input (signal). The input device 1630 may include at least one of a touch sensor, a push button, and a wheel type button. The input device 1630 may be disposed on, for example, an upper portion of the first control device 1600.

According to an embodiment, the output device 1640 may include at least one of a display and a speaker. When receiving a user input, the output device 1640 may output information about a function to be executed, under instruction of the processor 1660. The output device 1640 may further include an LED that outputs an operating state (e.g., power on/off) of the first control device 1600 under instruction of the processor 1660.

According to an embodiment, the memory 1650 may store, for example, commands or data associated with at least one other element of the first control device 1600. For example, the memory 1650 may store instructions for determining whether the first control device 1600 is connected with the second control device 1700 through the connection circuit 1610. In another example, the memory 1650 may store instructions for outputting function information corresponding to a connection state of the first control device 1600 through the output device 1640. In another example, the memory 1650 may store instructions for transmitting a request for execution of a function corresponding to a user input to the server device 1030. In another example, the memory 1650 may store instructions for setting a function associated with the first control device 1600, or setting a communication path, by communicating with the user terminal 1020. The memory 1650 may be a volatile memory (e.g., a RAM), a non-volatile memory (e.g., a ROM, a flash memory, or the like), or a combination thereof.

According to an embodiment, the processor 1660 may perform operations or data processing associated with control and/or communication of at least one other element of the first control device 1600 by using instructions stored in the memory 1650. The processor 1660 may include at least one of, for example, a central processing unit (CPU), a graphics processing unit (GPU), a microprocessor, an application processor, an application specific integrated circuit (ASIC), and field programmable gate arrays (FPGA) and may have a plurality of cores.

According to an embodiment, the processor 1660 may transmit a message associated with a request for execution of a first function to the server device 1030 through the communication circuit 1620 when the input device 1630 is operated in a first state in which the first control device 1600 is not connected with the second control device 1700 through the connection circuit 1610. For example, when the input device 1630 is operated in the first state, the processor 1660 may obtain information about the first function from the memory 1650 and may transmit a message associated with a request for execution of the first function to the server device 1030. The message associated with the request for execution of the first function may include, for example, identification information (e.g., an ID) of the first control device 1600 and a request for execution of the first function. According to various embodiments, the first control device 1600 may further include at least one coupling member 1017_1 from which at least one tag is detachable and the reader 1017_2 capable of obtaining information of the at least one tag. In this case, when at least one tag is attached to the at least one coupling member 1017_1, the processor 1660 may obtain information (e.g., an ID) of the at least one tag, may transmit the information of the at least one tag to the server device 1030, may obtain information about the first function in response to the transmission of the information, and may store the information about the first function in the memory 1650. When receiving a user input associated with execution of a function while at least one tag is attached, the processor 1660 may request a function corresponding to the at least one tag (corresponding to the first function information) from the server device 1030.

According to an embodiment, when the second control device 1700 is electrically connected to the second connection circuit 1612, the processor 1660 may determine that the first control device 1600 is a main control device. In the case where the first control device 1600 is determined to be a main control device, the processor 1660 may transmit a message to the second control device 1700 to request information of the second control device 1700 when identifying the connection with the second control device 1700 and may receive the information of the second control device 1700 from the second control device 1700 in response to the request. The information of the second control device 1700 may include at least one of, for example, identification information of the second control device 1700 and execution function information associated with the second control device 1700. In the case where the second control device 1700 is electrically connected with a third button, the second control device 1700 may receive information of the third control device and may transmit the received information about the third button to the first control device 1600 (e.g., the processor 1660). Then, the processor 1660 may determine that the first control device 1600 is connected with at least one third control device through the second control device 1700. In FIG. 16, for the convenience of description, it has been described that the first control device 1600 is connected with the second control device 1700.

According to an embodiment, in a second state in which the first control device 1600 is connected with the second control device 1700, the processor 1660 may transmit information about a sequence in which the first control device 1600 and the second control device 1700 are connected, to the server device 1030 through the communication circuit 1620. The connection sequence information may include, for example, connection sequence information of the first control device 1600 and the second control device 1700, which is associated with identification information of the first control device 1600 and the second control device 1700. In another example, the connection sequence information may include functions associated with the first control device 1600 and the second control device 1700 and connection sequence information of the first control device 1600 and the second control device 1700.

According to an embodiment, in response to the connection sequence information, the processor 1660 may receive second function information from the server device 1030 through the communication circuit 1620. The second function information may include, for example, information about a function to be executed by a target device when a user input is received.

According to an embodiment, when receiving the second function information, the processor 1660 may inform a user of the second function information through a voice or a screen by using the output device 1640. For example, the processor 1660 may display, on a display, at least one of text or an image associated with the second function. In another example, the processor 1660 may output text associated with the second function through a speaker.

According to an embodiment, when receiving a user input associated with execution of a specified function, the processor 1660 may transmit a message associated with a request for execution of the second function to the server device 1030 through the communication circuit 1620. In the case where the processor 1660 receives the user input, the processor 1660 may transmit the message, based on message information that defines a function to be requested from the server device 1030. When receiving the message associated with the request for execution of the second function, the server device 1030 may instruct the target device 1040 corresponding to the second function to execute the second function. The target device 1040 may be, for example, an IoT device, and the second function may be a function of changing the state of the IoT device. The user input may be received from the input device 1630. According to various embodiments, in the case where the first control device 1600 (a main control device) is located below the second control device 1700 (a sub-control device), a user input may be received from the second control device 1700.

While the first control device 1600 has been described as a main control device in the above embodiment, the first control device 1600 may operate as a sub-control device. Hereinafter, it will be shown that the first control device 1600 operates as a sub-control device and the second control device 1700 operates as a main control device, although other configurations are possible.

According to an embodiment, in a third state in which the first control device 1600 is connected with the second control device 1700 through the first connection circuit 1611, the processor 1660 may determine that the first control device 1600 is a sub-control device. The processor 1660 may deactivate the communication circuit 1620 when the first control device 1600 operates as a sub-control device. Thereafter, the processor 1660 may activate the communication circuit 1620 again when identifying that the first control device 1600 is disconnected.

According to an embodiment, in the third state in which the first control device 1600 is electrically connected with the second control device 1700 through the first connection circuit 1611, the processor 1660 may receive an identification information request message from the second control device 1700 and may transmit its own identification information in response to the request. Accordingly, the second control device 1700 (a main control device) may be associated with a function corresponding to an integrated control device (e.g., 1010 of FIG. 10) in which the first control device 1600 and the second control device 1700 are combined together, by using the identification information.

According to an embodiment, a third control device may be electrically connected to the second connection circuit 1612. When connected with the third control device through the second connection circuit 1612, the processor 1660 may transmit identification information request message to the third control device and may transmit identification information of the third button to the first control device 1600. The processor 1660 may additionally transmit information about a sequence in which the third control device and the second control device 1700 are combined.

According to various embodiments, in the case where a main control device is located at a higher position than a sub-control device, an input device of the sub-control device may be used as an input device of an integrated control device. For example, the first control device 1600 may be a sub-control device located above the second control device 1700 and may be connected with the second control device 1700 through the second connection circuit 1612. When the input device 1630 is operated, the processor 1660 may transmit a user input to the second control device 1700 (a main control device) through the second connection circuit 1612. For example, when the input device 1630 is operated by a user, the processor 1660 may transmit a user input to the second control device 1700 through the second connection circuit 1612. In this case, the second control device 1700 may receive the user input and may transmit a message associated with a request for execution of the second function to the server device 1030.

According to various embodiments, when receiving, from the server device 1030, an instruction to change at least one of the first and second functions received from the server device 1030 through the communication circuit 1620, the processor 1660 may change message information that defines the first function or the second function requested from an external device. The processor 1660 may store, in the memory 1650, function information about the changed function. When the first function or the second function is changed, the processor 1660 may output, through the output device 1640, screen information associated with the change of the function.

According to various embodiments, a user may set the position of a main control device and a sub-control device, as well as a function according to a connection sequence of an integrated control device (e.g., 1010 of FIG. 10).

According to various embodiments, a control device may be associated with various functions and may perform a function of a main control device or a sub-control device, depending on a sequence in which the control device is combined with another control device. Accordingly, a plurality of control devices may be used to provide functions more than the control devices.

Figure 18:
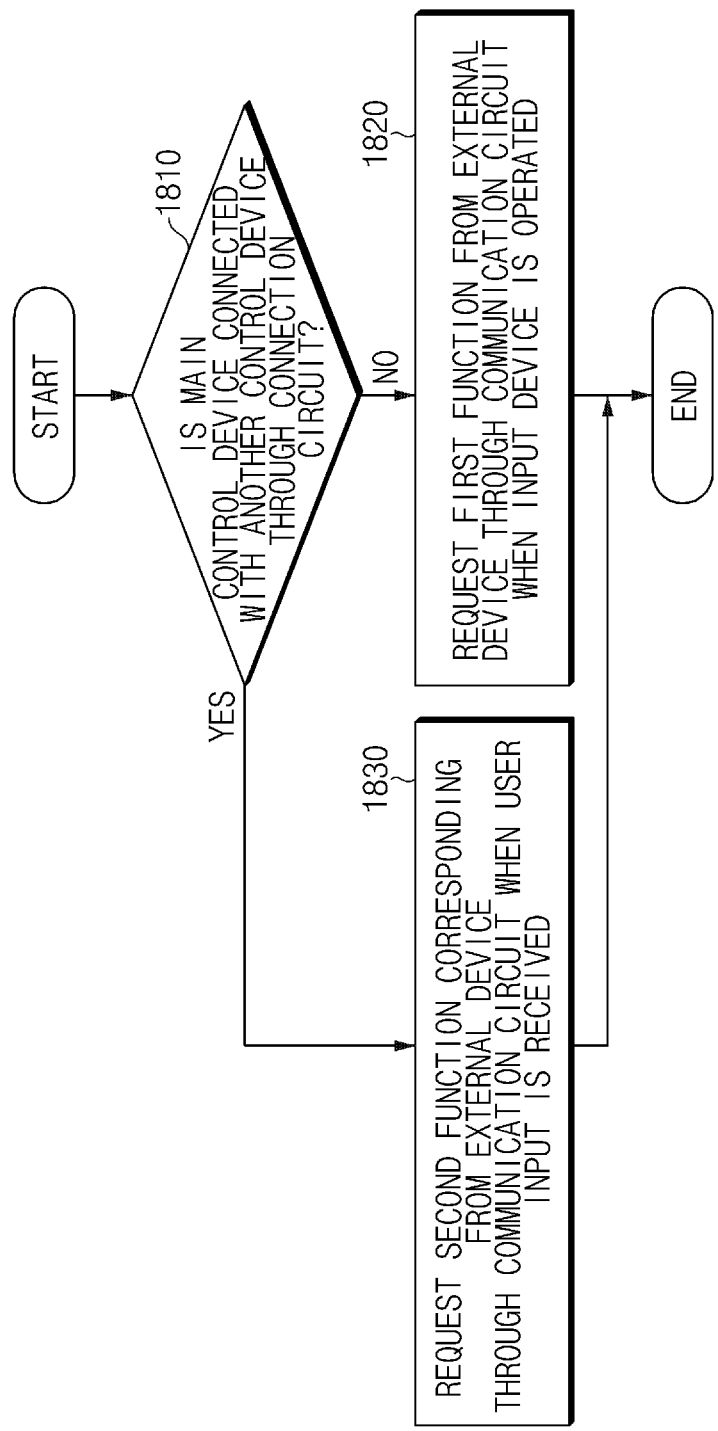
FIG. 18 is a flowchart illustrating a method for controlling a function of a main control device, according to an embodiment.

FIG. 18 is a flowchart illustrating a method for controlling a function of a main control device, according to an embodiment.

Referring to FIG. 18, in operation 1810, a processor (e.g., 1660 of FIG. 16) may determine whether a main control device is connected with another control device (e.g., 1700 of FIG. 17) through a connection circuit.

When the control device is not connected with the main control device, the processor 1660 may, in operation 1820, transmit a message associated with a request for execution of a first function to an external device (e.g., 1030 of FIG. 10) through the communication circuit 1620 when the input device 1630 is operated.

When the control device is connected with the main control device, the processor 1660 may, in operation 1830, transmit a message associated with a request for execution of a second function to the external device 1130 through the communication circuit 1620 when a user input associated with execution of a specified function is received. The user input may be received from the input device 1630 or the other control device (e.g., 1700 of FIG. 17).

Figure 19:
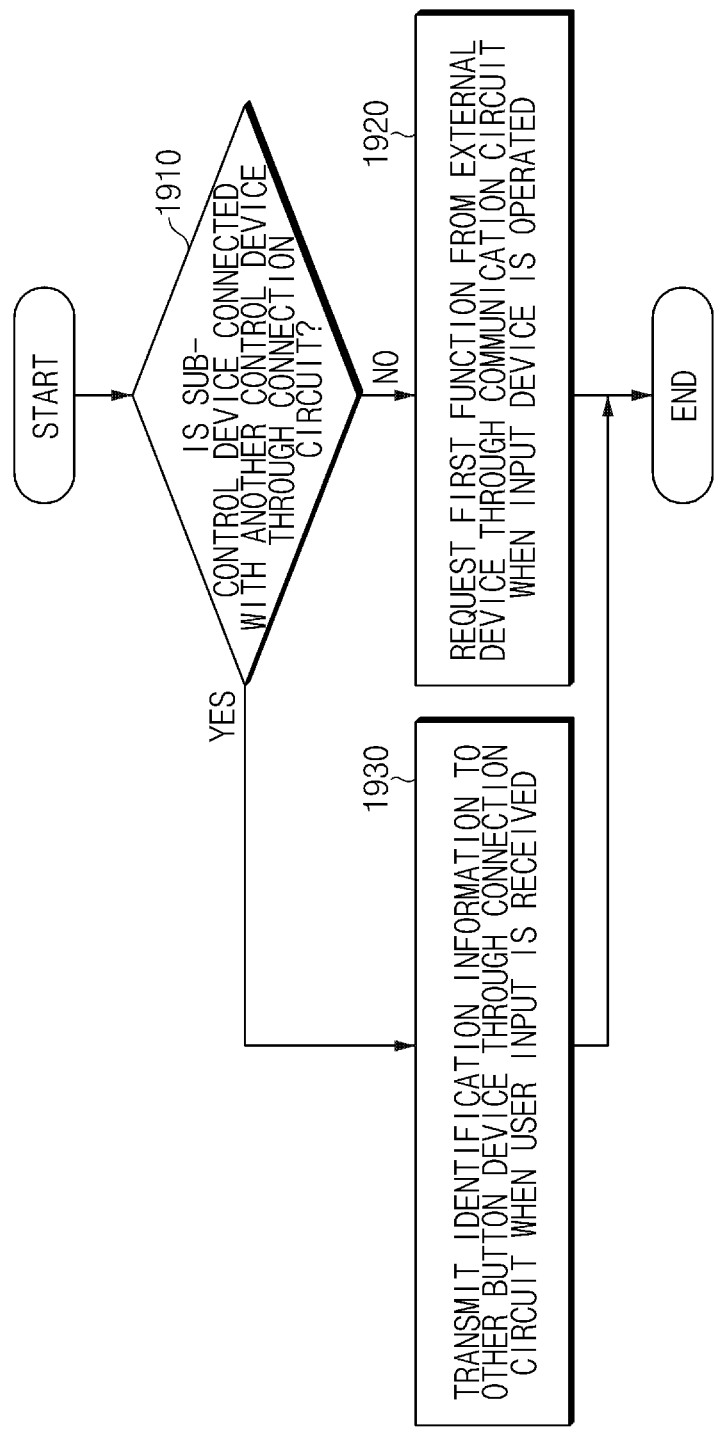
FIG. 19 is a flowchart illustrating a method for controlling a function of a sub-control device, according to an embodiment.

FIG. 19 is a flowchart illustrating a method for controlling a function of a sub-control device, according to an embodiment.

Referring to FIG. 19, in operation 1910, a processor (e.g., 1660 of FIG. 16) may determine whether a sub-control device is connected with another control device (e.g., 1700 of FIG. 17) through a connection circuit.

When another control device (e.g., 1700 of FIG. 17) is not connected, the processor 1660 may, in operation 1920, transmit a message associated with a request for execution of a first function to the external device 1030 through the communication circuit 1620 when the input device 1630 is operated.

When another control device 1700 is connected, the processor 1660 may, in operation 1930, configure the other control device 1700 to transmit, to the external device 1030, a message associated with a request for execution of a second function in response to a user input, by transmitting identification information to the other control device 1700 through the connection circuit 1610.

Figure 20:
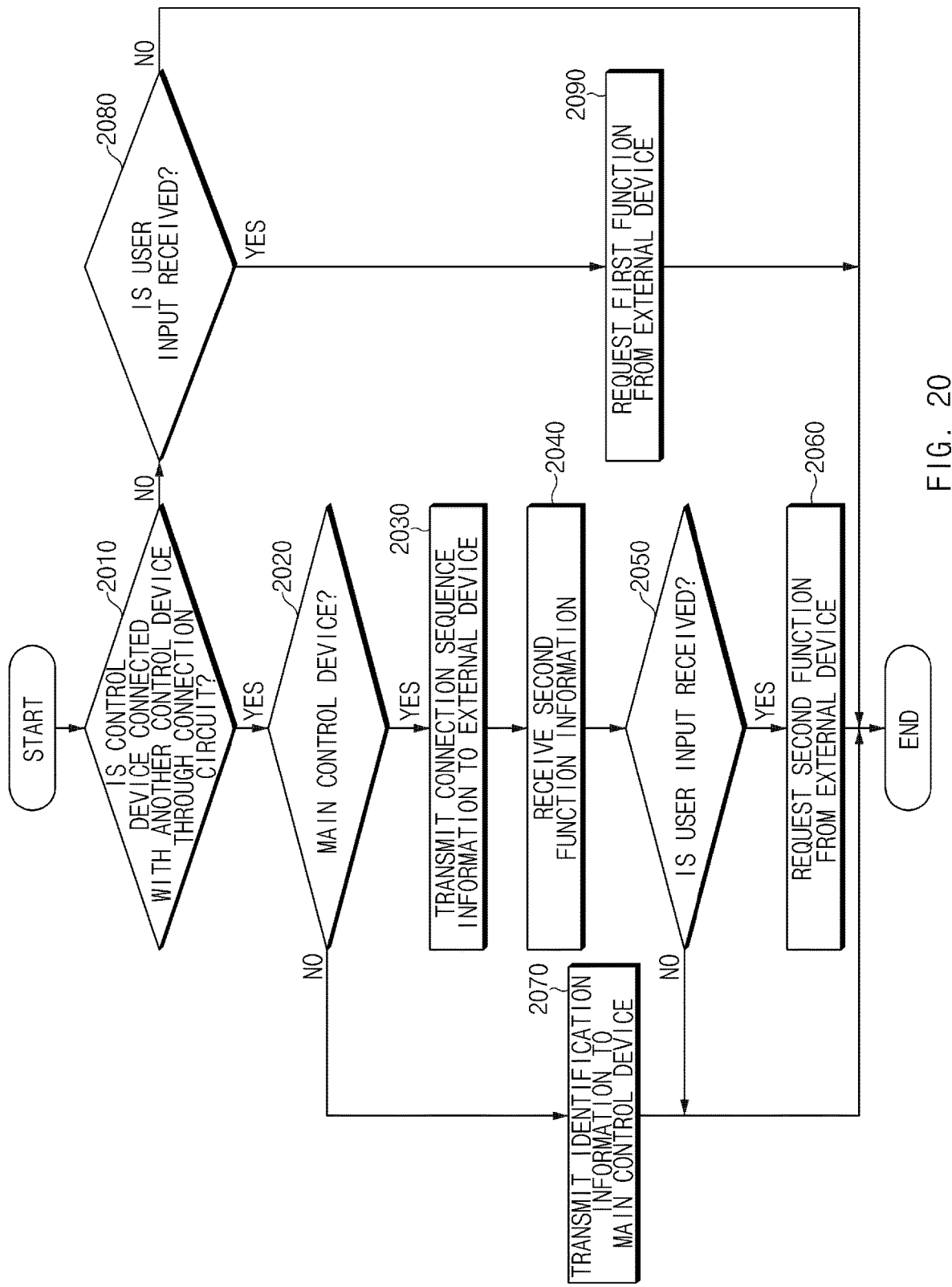
FIG. 20 is a flowchart illustrating a method for controlling a detailed function of a control device, according to an embodiment.

FIG. 20 is a flowchart illustrating a method for controlling a detailed function of a control device, according to an embodiment.

Referring to FIG. 20, in operation 2010, a processor (e.g., 1660 of FIG. 16) may determine whether a control device is connected with another control device (e.g., 1700 of FIG. 17) through the connection circuit 1610.

When the control device is connected with the other control device 1700 through the connection circuit 1610, the processor 1660 may, in operation 2020, determine whether the control device is a main control device. The processor 1660 may determine whether the control device is a main control device or a sub-control device, depending on whether the control device is connected to the first connection circuit 1611 or the second connection circuit 1612.

In operation 2030, the processor 1660 may transmit connection sequence information to the external device 1030. The connection sequence information may be associated with a sequence in which control devices are combined together in a specified direction, for example, from top to down.

In operation 2040, the processor 1660 may receive second function information corresponding to the connection sequence information from the external device 1030.

In operation 2050, the processor 1660 may determine whether a user input is received. The user input may be received from a sub-control device or the input device 1630.

When the user input is received, the processor 1660 may, in operation 2060, transmit a message associated with a request for execution of the second function to the external device 1030.

When the determination result in operation 2020 shows that the control device (e.g., 1600 of FIG. 16) is a sub-control device, the processor 1660 may, in operation 2070, transmit identification information of the control device 1600 to a main control device.

When the determination result in operation 2010 shows that the control device is not connected with another control device through the connection circuit 1610, the processor 1660 may, in operation 2080, determine whether a user input is received.

When the user input is received, the processor 1660 may, in operation 2090, transmit a message associated with a request for execution of a first function to the external device.

According to an embodiment, a control device (e.g., see the reference numeral 1600 of FIG. 16) includes a housing (e.g., 1600H of FIG. 17) including a first surface and a second surface facing away from the first surface; an input device (e.g., 1630 of FIG. 16) exposed through a portion of the first surface; a communication circuit (e.g., 1620 of FIG. 16) disposed between the first surface and the second surface and capable of communication with an external device; a connection circuit (e.g., 1610 of FIG. 16) exposed through a portion of at least one of the first surface and the second surface and electrically connected with another control device; a processor (e.g., 1660 of FIG. 16) disposed between the first surface and the second surface and operatively connected with the input device, the communication circuit, and the connection circuit; and a memory (e.g., 1650 of FIG. 16) disposed between the first surface and the second surface and electrically connected with the processor, wherein the memory stores one or more instructions that, when executed, cause the processor to in a first state in which the control device is not connected with the another control device through the connection circuit, transmit a message associated with a request for execution of a first function to the external device through the communication circuit when receiving an input signal based on the input device; and in a second state in which the control device is connected with the another control device through the connection circuit, transmit a message associated with a request for execution of a second function corresponding to the second state to the external device through the communication circuit when receiving a user input associated with execution of a specified function.

Wherein the memory additionally stores instructions that, when executed, cause the processor to when receiving information of the another control device through the connection circuit, decide that the control device is in the second state.

Wherein the memory additionally stores instructions that, when executed, cause the processor to when determining that the control device is connected with the another control device, transmit information for notifying of the second state to the external device through the communication circuit; and receive second function information corresponding to the second state from the external device.

The control device further includes an output device (e.g., 1640 of FIG. 16), wherein the memory additionally stores instructions that, when executed, cause the processor to when receiving the second function information, output screen information through the output device according to the execution of the second function.

Wherein the user input is received from the another control device through the connection circuit.

Wherein the second function includes a function of sequentially or collectively executing a third function associated with the another control device and the first function; a function different from the first function and the third function; or a function of associating and executing the first function and the third function.

Wherein the memory additionally stores instructions that, when executed, cause the processor to receive information for notifying of a third state in which the another control device is connected with yet another control device, from the another control device through the connection circuit; and when receiving the user input in the third state, transmit a message associated with a request for execution of a fourth function to the external device through the communication circuit.

Wherein the first function or the second function includes a function of changing a state of an Internet of Things (IoT) device through the external device.

Wherein a form of the second function varies depending on information about a sequence in which the another control device and the control device are connected together.

The control device further includes at least one coupling member (e.g., 1017_1 of FIG. 14) from which at least one tag is detachable; and a reader (e.g., 1017_2 of FIG. 14) capable of obtaining information of the at least one tag, wherein the memory additionally stores instructions that, when executed, cause the processor to obtain the information of the at least one tag through the reader; and request a function corresponding to the information of the at least one tag from the external device.

Wherein the memory additionally stores instructions that, when executed, cause the processor to when receiving, from the external device, an instruction to change at least one of the first function and the second function, update message information that defines the first function or the second function requested from the external device.

The control device further includes an output device, wherein the memory additionally stores instructions that, when executed, cause the processor to when the first function or the second function is changed, output screen information associated with the change of the first or second function through the output device.

A control device (e.g., 1600 of FIG. 16) includes a housing (e.g., 1600H of FIG. 17) including a first surface and a second surface facing away from the first surface; an input device (e.g., 1630 of FIG. 16) exposed through a portion of the first surface; a communication circuit (e.g., 1620 of FIG. 16) disposed between the first surface and the second surface and capable of communication with an external device; a connection circuit (e.g., 1610 of FIG. 16) exposed through a portion of at least one of the first surface and the second surface and configured to be electrically connected with another control device; a processor (e.g., 1660 of FIG. 16) disposed between the first surface and the second surface and operatively connected with the input device, the communication circuit, and the connection circuit; and a memory (e.g., 1650 of FIG. 16) configured to store identification information, the memory being disposed between the first surface and the second surface and electrically connected with the processor. Wherein the memory stores one or more instructions that, when executed, cause the processor to when the control device is not connected with the another control device through the connection circuit, transmit a message associated with a request for execution of a first function to the external device through the communication circuit when receiving an input signal based on the input device; and when the control device is connected with the another control device through the connection circuit, transmit the identification information to the another control device through the connection circuit to allow the another control device to request a second function from the external device in response to a user input.

Wherein the memory additionally stores instructions that, when executed, cause the processor to transmit the identification information through the connection circuit in response to a request of the another control device.

Wherein the memory additionally stores instructions that, when executed, cause the processor to when the input device is operated in the second state, transmit the user input to the another control device through the connection circuit to allow the another control device to transmit a message associated with a request for execution the second function to the external device.

Wherein the second function includes a function of sequentially or collectively executing the first function and a third function associated with the another control device; a function different from the first function and the third function; or a function of associating and executing the first function and the third function.

Wherein the connection circuit includes a first connection circuit electrically connected with the another control device and a second connection circuit that is able to be connected with yet another control device, and wherein the memory additionally stores instructions that, when executed, cause the processor to when the control device is connected with the yet another control device through the second connection circuit, transmit a message to the yet another control device to request identification information of the yet another control device and receive the identification information of the yet another control device from the yet another control device in response to the request; and transmit the identification information of the yet another control device to the another control device.

The control device further includes at least one coupling member (e.g., 1017_1 of FIG. 14) from which at least one tag is detachable; and a reader (e.g., 1017_2 of FIG. 14) capable of obtaining information of the at least one tag, wherein the memory additionally stores instructions that, when executed, cause the processor to obtain the information of the at least one tag through the reader; and request a function corresponding to the information of the at least one tag from the external device.

Wherein the memory additionally stores instructions that, when executed, cause the processor to when receiving, from the external device, an instruction to change at least one of the first function and the second function received from the external device through the communication circuit, update message information that defines the first function or the second function requested from the external device.

A method for controlling a function by a control device (e.g., 1600 of FIG. 16), the method includes determining whether the control device is connected with another control device through a connection circuit; in a first state in which the control device is not connected with the another control device, transmitting a message associated with a request for execution of a first function to an external device through a communication circuit when receiving a message based on an input device; and in a second state in which the control device is connected with the another control device, transmitting a message associated with a request for execution of a second function corresponding to the second state to the external device through the communication circuit when receiving a user input associated with execution of a specified function.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A control device associated with a first Internet of Things (IoT) device, the control device comprising:
   a housing including a first surface and a second surface facing away from the first surface;
   an input device exposed through a portion of the first surface;
   a communication circuit disposed between the first surface and the second surface and capable of communication with an external device;
   a connection circuit exposed through a portion of at least one of the first surface and the second surface and configured to be electrically connected with another control device;
   a processor disposed between the first surface and the second surface and operatively connected with the input device, the communication circuit, and the connection circuit; and
   a memory disposed between the first surface and the second surface and electrically connected with the processor,
   wherein the memory stores one or more instructions that, when executed, cause the processor to:
   responsive to receiving an input at the input device:
      when the control device is not connected with the another control device associated with a second IoT device, through the connection circuit, transmit a message associated with a request for execution of a first function to the external device through the communication circuit in response to receiving an input signal based on the input device, wherein the first function changes a state of the first IoT device; and
      when the control device is connected with the another control device through the connection circuit, transmit a message associated with a request for execution of a second function to the external device through the communication circuit in response to receiving a user input associated with execution of a specified function, wherein the second function changes the state of the first IoT device and a state of the second IoT device.

2. The control device of claim 1, wherein the memory additionally stores instructions that, when executed, cause the processor to:
   when receiving information of the another control device through the connection circuit, detect that the control device is connected to the another control device.

3. The control device of claim 1, wherein the memory additionally stores instructions that, when executed, cause the processor to:
   when detecting that the control device is connected with the another control device, transmit a notification that the control device is connected with the another control device to the external device through the communication circuit; and
   receive an identification of the second function response to detecting that the control device is connected with the another control device.

4. The control device of claim 3, further comprising:
   an output device,
   wherein the memory additionally stores instructions that, when executed, cause the processor to:
   when receiving the identification of the second function, output screen information through the output device according to the execution of the second function.

5. The control device of claim 1, wherein the connection circuit is connected to the another device and wherein the user input is received from the another control device through the connection circuit.

6. The control device of claim 1, wherein the second function includes at least one of:
   a function of sequentially or collectively executing a third function associated with the another control device and the first function;
   a function different from the first function and the third function; and
   a function of associating and executing the first function and the third function.

7. The control device of claim 1, wherein the memory additionally stores instructions that, when executed, cause the processor to:
   detect that the another control device is connected with a third control device, through the connection circuit; and
   when receiving the user input when the third control device is connected with the another control device, transmit a message associated with a request for execution of a fourth function to the external device through the communication circuit.

8. The control device of claim 1, wherein the second function varies based on a sequence in which the another control device and the control device are detected together.

9. The control device of claim 1, further comprising:
   at least one coupling member from which at least one tag is detachably connectable; and
   a reader configured to obtain information of the at least one tag,
   wherein the memory additionally stores instructions that, when executed, cause the processor to:
   obtain the information of the at least one tag through the reader when the tag is detachably connected to the at least one coupling member; and request a function corresponding to the information of the at least one tag from the external device.

10. The control device of claim 1, wherein the memory additionally stores instructions that, when executed, cause the processor to:
when receiving, from the external device, an instruction to change at least one of the first function and the second function, update message information that defines the first function or the second function requested from the external device.

11. The control device of claim 10, further comprising:
an output device,
wherein the memory additionally stores instructions that, when executed, cause the processor to:
when the first function or the second function is changed, output screen information associated with the change of the first or second function through the output device.

12. A control device comprising:
a housing including a first surface and a second surface facing away from the first surface;
an input device exposed through a portion of the first surface;
a communication circuit disposed between the first surface and the second surface and capable of communication with an external device;
a connection circuit exposed through a portion of at least one of the first surface and the second surface and configured to be electrically connected with another control device;
a processor disposed between the first surface and the second surface and operatively connected with the input device, the communication circuit, and the connection circuit; and
a memory configured to store identification information of a first Internet of Things (IoT) device, the first IoT device being different from the control device, the memory being disposed between the first surface and the second surface and electrically connected with the processor,
wherein the memory stores one or more instructions that, when executed, cause the processor to:
when the control device is not connected with the another control device through the connection circuit, transmit a message associated with a request for execution of a first function changing a state of the first IoT device to the external device through the communication circuit in response to receiving an input signal from the input device; and
when the control device is connected with the another control device associated with a second IoT device through the connection circuit, transmit the identification information to the another control device through the connection circuit thereby causing the another control device to request a second function from the external device in response to a user input, wherein the second function changes the state of the first IoT device and the second IoT device.

13. The control device of claim 12, wherein the memory additionally stores instructions that, when executed, cause the processor to:
transmit the identification information through the connection circuit in response to a request of the another control device.

14. The control device of claim 12, wherein the memory additionally stores instructions that, when executed, cause the processor to:
when the control device is connected to the another control device, transmit the user input to the another control device through the connection circuit to thereby causing the another control device to transmit a message associated with a request for execution the second function to the external device.

15. The control device of claim 12, wherein the second function includes at least one of:
a function of sequentially or collectively executing the first function and a third function associated with the another control device;
a function different from the first function and the third function; and
a function of associating and executing the first function and the third function.

16. The control device of claim 12, wherein the connection circuit includes a first connection circuit configured to be electrically connected with the another control device and a second connection circuit configured to be connected with a third control device, and
wherein the memory additionally stores instructions that, when executed, cause the processor to:
when the control device is connected with the third control device through the second connection circuit, transmit a message to the third control device to request identification information of the third control device and receive the identification information of the third control device from the third control device in response to the request; and
transmit the identification information of the third control device to the another control device.

17. The control device of claim 12, further comprising:
at least one coupling member from which at least one tag is detachably connectable; and
a reader capable of obtaining information of the at least one tag,
wherein the memory additionally stores instructions that, when executed, cause the processor to:
obtain the information of the at least one tag through the reader when the tag is detachably connected; and
request a function corresponding to the information of the at least one tag from the external device.

18. The control device of claim 12, wherein the memory additionally stores instructions that, when executed, cause the processor to:
when receiving, from the external device, an instruction to change at least one of the first function and the second function received from the external device through the communication circuit, update message information that defines the first function or the second function requested from the external device.

19. A method for controlling a function by a control device associated with a first Internet of Things (IoT) device, the method comprising:
determining whether the control device is connected with another control device through a connection circuit;
when the control device is not connected with the another control device associated with a second IoT device, transmitting a message associated with a request for execution of a first function to an external device through a communication circuit in response to receiving a message based on an input device, wherein the first function changes a state of the first IoT device; and
when the control device is connected with the another control device, transmitting a message associated with a request for execution of a second function to the external device through the communication circuit in response to receiving a user input associated with execution of a specified function, wherein the second function changes the state of the first IoT device and a state of the second IoT device.

20. The control device of claim 1, wherein the changed state of the second IOT is based on the changed state of the first IOT.

* * * * *